United States Patent
Chan et al.

(10) Patent No.: US 12,310,300 B2
(45) Date of Patent: May 27, 2025

(54) HAND TOOL WITH SHEAR ASSEMBLY

(71) Applicant: TECHTRONIC CORDLESS GP, Anderson, SC (US)

(72) Inventors: Rony Chan, Simpsonville, SC (US); Samuel Nelson, Easley, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 400 days.

(21) Appl. No.: 17/704,937

(22) Filed: Mar. 25, 2022

(65) Prior Publication Data

US 2022/0312682 A1    Oct. 6, 2022

Related U.S. Application Data

(60) Provisional application No. 63/168,893, filed on Mar. 31, 2021.

(51) Int. Cl.
| | |
|---|---|
| *A01G 3/025* | (2006.01) |
| *A01G 3/02* | (2006.01) |
| *A01G 3/047* | (2006.01) |
| *A01G 3/08* | (2006.01) |

(52) U.S. Cl.
CPC ........... *A01G 3/0251* (2013.01); *A01G 3/021* (2013.01); *A01G 3/0475* (2013.01); *A01G 3/081* (2013.01)

(58) Field of Classification Search
CPC .......... A01G 3/02; A01G 3/021; A01G 3/025; A01G 3/0251; A01G 3/081
USPC ............................................................ D8/5
See application file for complete search history.

(56) References Cited

U.S. PATENT DOCUMENTS

| | | | | |
|---|---|---|---|---|
| 147,868 | A * | 2/1874 | Seger et al. | B26B 29/04 30/259 |
| 246,399 | A * | 8/1881 | Layman | A01G 3/021 30/250 |
| 336,383 | A * | 2/1886 | Casterlin et al. | A01G 3/025 30/238 |
| 460,705 | A * | 10/1891 | Hansen | A01G 3/025 30/238 |
| 777,567 | A * | 12/1904 | Taylor et al. | A01G 3/02 30/239 |
| 906,255 | A * | 12/1908 | Melander | A01G 3/02 30/267 |
| 1,137,380 | A * | 4/1915 | Buell | A01G 3/025 30/250 |

(Continued)

FOREIGN PATENT DOCUMENTS

GB        191311352 A      1/1914

OTHER PUBLICATIONS

Canadian Office Action Corresponding with Application No. 3,153,971 on May 26, 2023 (1 page).

*Primary Examiner* — Jason Daniel Prone
(74) *Attorney, Agent, or Firm* — Dority & Manning, P.A.

(57) ABSTRACT

A hand tool including a shear assembly is provided, including a first handle, a second handle including a cutting member, and a cutting blade. The cutting blade forms a first opening and a second opening. The first handle is attachable in a first operating mode to the cutting blade at the first opening via a first fastener. The first handle is attachable in a second operating mode to the cutting blade at the second opening via the first fastener. The cutting blade is attached in pivotal arrangement to the second handle via a second fastener.

17 Claims, 15 Drawing Sheets

(56) References Cited

U.S. PATENT DOCUMENTS

| | | | | | |
|---|---|---|---|---|---|
| 1,214,635 | A | * | 2/1917 | Zimmerman | A01G 3/025 30/250 |
| 1,218,157 | A | * | 3/1917 | Anderson | A01G 3/025 30/237 |
| 1,254,284 | A | * | 1/1918 | Southwood | A01G 3/025 30/248 |
| 2,090,228 | A | * | 8/1937 | Porter et al. | A01G 3/0251 30/252 |
| 2,310,959 | A | * | 2/1943 | James | A01G 3/02 30/186 |
| 2,384,822 | A | * | 9/1945 | Drmic | A01G 3/02 30/250 |
| 2,508,790 | A | * | 5/1950 | Herr | A01G 3/02 30/239 |
| 2,520,905 | A | * | 9/1950 | Borrelli | A01G 3/02 30/237 |
| 3,273,240 | A | * | 9/1966 | Florian | A01G 3/0251 30/192 |
| 3,390,455 | A | * | 7/1968 | Florian | A01G 3/0251 30/251 |
| 3,562,908 | A | * | 2/1971 | Rogers | A01G 3/02 30/261 |
| 5,020,222 | A | * | 6/1991 | Gosselin | B26B 13/26 30/341 |
| 5,159,757 | A | * | 11/1992 | Weid | A01G 3/0251 30/249 |
| 5,511,314 | A | * | 4/1996 | Huang | A01G 3/0251 30/249 |
| 5,689,888 | A | * | 11/1997 | Linden | A01G 3/0251 30/192 |
| 5,709,030 | A | * | 1/1998 | Wang | A01G 3/0251 30/249 |
| 5,761,815 | A | * | 6/1998 | Lin | A01G 3/0251 30/140 |
| 5,839,195 | A | * | 11/1998 | Lin | A01G 3/0251 30/249 |
| 5,950,314 | A | * | 9/1999 | Chang | A01G 3/0251 30/244 |
| 6,345,446 | B1 | * | 2/2002 | Huang | A01G 3/0251 30/192 |
| 6,453,561 | B1 | * | 9/2002 | Chou | A01G 3/0251 30/271 |
| 6,640,442 | B2 | * | 11/2003 | Lin | A01G 3/0251 30/249 |
| 6,681,492 | B1 | * | 1/2004 | Huang | A01G 3/0251 30/249 |
| 6,981,326 | B1 | * | 1/2006 | Huang | A01G 3/0251 30/341 |
| 7,640,666 | B1 | * | 1/2010 | Huang | A01G 3/0475 30/131 |
| 8,166,659 | B2 | * | 5/2012 | Huang | A01G 3/0251 30/190 |
| 8,220,164 | B2 | * | 7/2012 | Linden | A01G 3/0251 30/340 |
| 8,225,513 | B2 | * | 7/2012 | Huang | A01G 3/0251 30/190 |
| 8,327,549 | B2 | * | 12/2012 | Huang | A01G 3/0251 30/190 |
| 8,458,912 | B2 | * | 6/2013 | Linden | A01G 3/02 30/131 |
| 8,661,691 | B2 | * | 3/2014 | Huang | A01G 3/0251 30/245 |
| D702,516 | S | * | 4/2014 | Liu | D8/5 |
| 8,732,960 | B2 | * | 5/2014 | Wang | A01G 3/021 30/244 |
| 8,881,407 | B2 | * | 11/2014 | Wang | A01G 3/021 30/194 |
| RE45,488 | E | * | 4/2015 | Block | A01G 3/0251 30/249 |
| 9,066,473 | B2 | * | 6/2015 | Podlesny | A01G 3/021 |
| 9,282,697 | B2 | * | 3/2016 | Wu | A01G 3/021 |
| 9,345,200 | B2 | * | 5/2016 | Cunningham | A01G 3/0251 |
| 9,426,945 | B2 | * | 8/2016 | Hsu | A01G 3/021 |
| 9,554,522 | B2 | * | 1/2017 | Reh | A01G 3/0251 |
| 9,591,808 | B2 | * | 3/2017 | Lin | A01G 3/0251 |
| 9,622,422 | B2 | * | 4/2017 | Hsu | A01G 3/021 |
| 9,736,990 | B2 | * | 8/2017 | Lin | A01G 3/0251 |
| 10,130,042 | B2 | * | 11/2018 | Lin | A01G 3/021 |
| 10,136,583 | B2 | * | 11/2018 | Dechant | A01G 3/021 |
| 10,212,891 | B1 | * | 2/2019 | Wu | A01G 3/0251 |
| D847,590 | S | * | 5/2019 | Janson | D8/5 |
| 11,324,169 | B2 | * | 5/2022 | Huang | A01G 3/025 |
| 11,968,935 | B2 | * | 4/2024 | Huang | A01G 3/0251 |
| 2006/0026845 | A1 | * | 2/2006 | Lin | A01G 3/0251 30/249 |
| 2010/0043237 | A1 | | 2/2010 | Olavi et al. | |
| 2010/0269357 | A1 | * | 10/2010 | Shan | A01G 3/0251 30/254 |
| 2011/0154668 | A1 | * | 6/2011 | Liu | A01G 3/0251 30/252 |
| 2014/0053413 | A1 | * | 2/2014 | Huang | A01G 3/0251 30/252 |
| 2016/0120132 | A1 | * | 5/2016 | Hsu | A01G 3/021 30/251 |
| 2016/0345506 | A1 | * | 12/2016 | Lin | A01G 3/021 |
| 2022/0304242 | A1 | * | 9/2022 | Heine | A01G 3/0251 |
| 2022/0346326 | A1 | * | 11/2022 | Chan | A01G 3/021 |

* cited by examiner

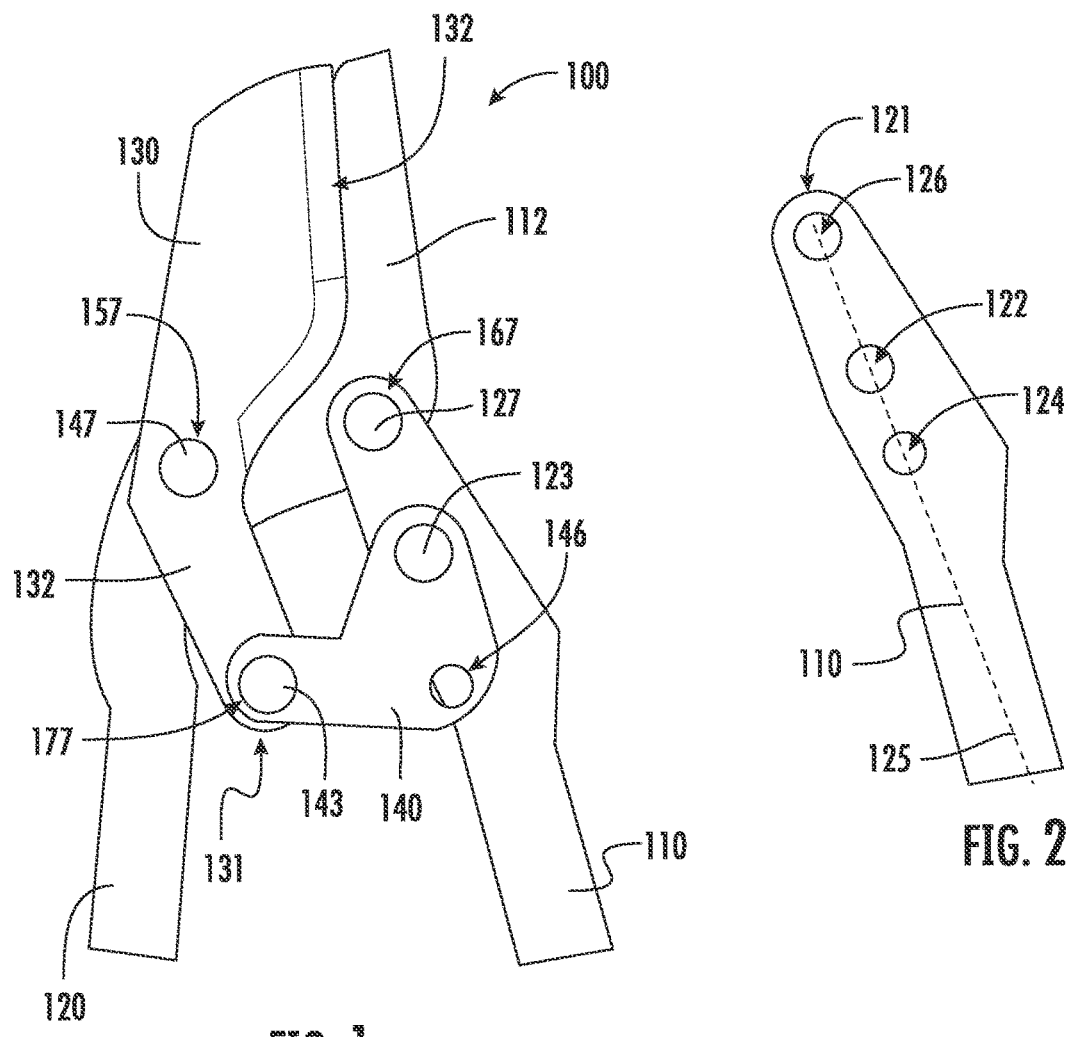
FIG. 1
FIG. 2
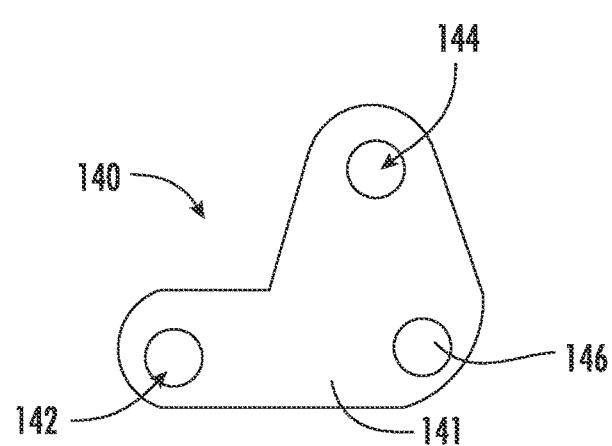
FIG. 3

HAND TOOL WITH SHEAR ASSEMBLY

PRIORITY STATEMENT

The present application claims the benefit of priority to U.S. Provisional Patent Application Ser. No. 63/168,893, filed on Mar. 31, 2021, the disclosure of which is incorporated by reference herein in its entirety.

FIELD

The present subject matter is directed generally to hand tools with shear assemblies, such as outdoor shears and loppers.

BACKGROUND

Hand tools, such as outdoor shears, garden shears, hedge shears, or loppers, are configured to cut members by a force exerted by a user at a pair of handles. Members, such as branches, hedges, bushes, etc., may be of various thicknesses, densities, or strengths, which may correspondingly require different amounts of force to be exerted by the user through the handles. Limited movement of the handles may limit an amount of force that may be exerted by the hand tool to cut such various members. Additionally, hand tools may require repeated motions to quickly cut through multiple members. For instance, a user may require a hand tool to quickly cut through thinner, lighter members, such as hedges and bushes. In another instance, a user may require a hand tool to apply relatively large amounts of shear force to cut through relatively thicker, denser, or stronger members, such as branches. Shear assemblies for hand tools may generally perform one type of usage or the other.

Accordingly, improved shear designs are desired in the art. In particular, improved shear designs which can move between compound and single action would be advantageous. Still particularly, improved shear designs which can move between compound and single action for a single hand tool would be advantageous.

BRIEF DESCRIPTION

Aspects and advantages of the invention will be set forth in part in the following description, or may be obvious from the description, or may be learned through practice of the invention.

An aspect of the present disclosure is directed to a hand tool including a shear assembly. The hand tool includes a first handle, a second handle including a cutting member, and a cutting blade. The cutting blade forms a first opening and a second opening. The first handle is attachable in a first operating mode to the cutting blade at the first opening via a first fastener. The first handle is attachable in a second operating mode to the cutting blade at the second opening via the first fastener. The cutting blade is attached in pivotal arrangement to the second handle via a second fastener.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts a top-down view of an exemplary embodiment of a hand tool in accordance with aspects of the present disclosure;

FIG. 2 depicts an exemplary embodiment of a first handle of the hand tool of FIG. 1 in accordance with aspects of the present disclosure;

FIG. 3 depicts an exemplary embodiment of a linkage of the hand tool of FIG. 1 in accordance with aspects of the present disclosure;

Figure 4A:
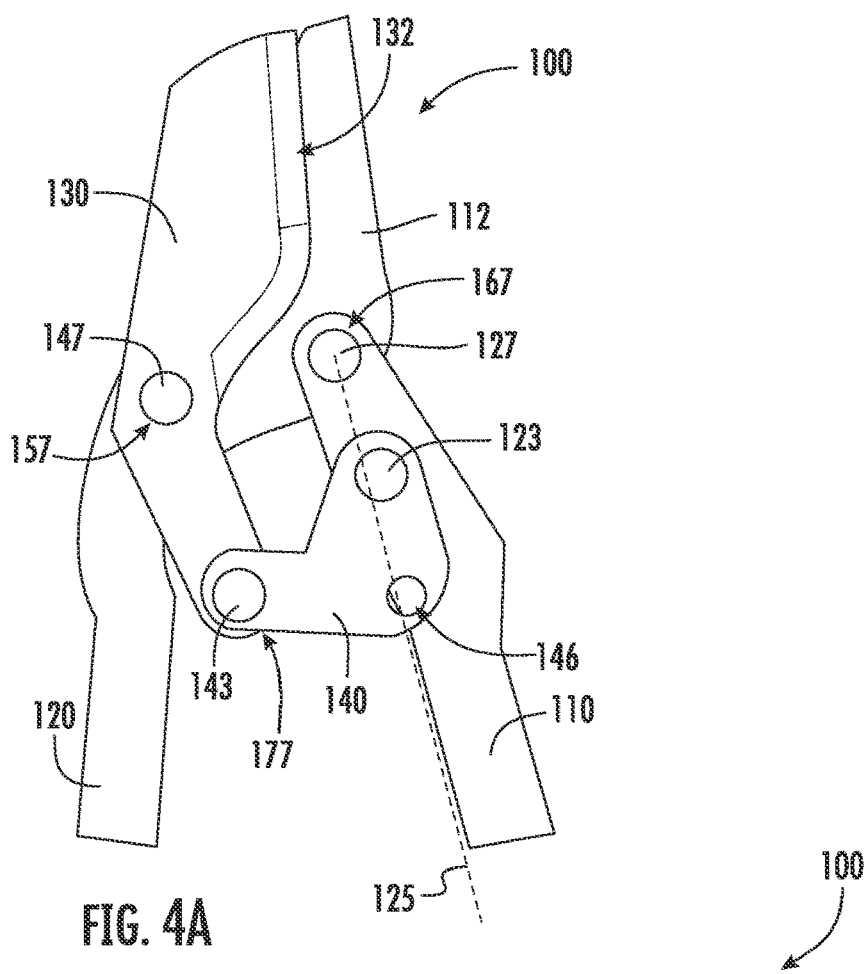
FIG. 4A depicts an exemplary embodiment of the hand tool of FIG. 1 in a first operating mode in a closed position in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to improved shear designs, and in particular improved shear designs which can move between compound and single action.

As used herein, the terms "first", "second", and "third" may be used interchangeably to distinguish one component from another and are not intended to signify location or importance of the individual components.

Embodiments of a hand tool with a shearing, cutting, lopper, or other appropriate cutting tool are provided. Various embodiments of the hand tool provided herein are configured to selectively articulate between a single action movement and a compound action movement, such as to allow for greater range or angle of motion between handles. Embodiments provided herein may allow a user to relatively simply and quickly change between operating modes, such as to facilitate greater application of force for cutting members in a first operating mode, and such as to facilitate quicker opening and closing action in a second operating mode. Still particular embodiments provided herein may allow a user to articulate between the first and second operating modes without necessitating removal, separation, or disconnection of components from the hand tool. Various embodiments provided herein may form a hedge shear, a garden shear, a lopper, a pruner tool, or other appropriate hand tool.

Exemplary embodiments of a hand tool with a shear assembly are provided. Referring now to FIGS. 1-3, FIGS. 4A-4B, and FIGS. 5A-5B, exemplary embodiment of hand tool 100 includes a shear assembly having a first handle 110 and a second handle 120. Second handle 120 includes a cutting member 112, such as a shaving block or shearing tool, configured to selectively engage a cutting blade 130. The cutting blade 130 is connected to the first handle 110. Cutting blade 130 includes a blade edge 132. Blade edge 132 is configured to selectively engage cutting member 112, such as to cut, shear, or lop a member placed between the blade edge 132 and the cutting member 112. In a particular embodiment, cutting blade 130 is affixed to the second handle 120 at fastener 147. Fastener 147 extends into second handle 120 and cutting blade 130, such as through an opening at a second handle-cutting blade interface, such as a first interface 157, corresponding to second handle 120 and cutting blade 130. In various embodiments, fastener 147 extends fully through cutting blade 130 and at least partially through second handle 120. In particular embodiments, second handle 120 is configured to allow cutting blade 130 to pivot at fastener 147 extended through the opening at first interface 157.

In a particular embodiment, first handle 110 is affixed to second handle 120 at fastener 127. Fastener 127 extends into first handle 110 and second handle 120 at a second interface 167. Second interface 167 forms an opening into second handle 120 and first handle 110 into which fastener 127 is positioned. In various embodiments, fastener 127 extends fully through first handle 110 and at least partially through second handle 120. In particular embodiments, second handle 120 is configured to allow first handle 110 to pivot at fastener 127 extended through the opening at second interface 167.

First handle 110 forms a proximal end 121 relative to second handle 120. First handle 110 forms opening 126 configured to receive fastener 127 at the proximal end 121. Accordingly, opening 126 is positioned at second interface 167 at which first handle 110 and second handle 120 are connected via fastener 127 at the proximal end 121 of second handle 120.

First handle 110 furthermore forms a first fastener opening 122 and a second fastener opening 124. First fastener opening 122 is formed proximate to opening 126 relative to the second fastener opening 124. First handle 110 forms first fastener opening 122 separated along axis 125 from second fastener opening 124. In various modes of operation, such as further described herein, fastener 123 is positioned through one of first fastener opening 122 or second fastener opening 124 and a respective opening at linkage 140.

Cutting blade 130 forms a distal end 131 relative to blade edge 132. First interface 157 is positioned between blade edge 132 and distal end 131. In a particular embodiment, cutting blade 130 includes linkage 140 configured to attach cutting blade 130 to first handle 110. Cutting blade 130 is affixed to linkage 140 at fastener 143. Fastener 143 extends into linkage 140 and cutting blade 130 at a third interface 177. Third interface 177 forms an opening into the cutting blade 130 and linkage 140 into which fastener 143 is positioned. In various embodiments, fastener 143 extends fully through linkage 140 and at least partially through cutting blade 130. In particular embodiments, linkage 140 is configured to allow cutting blade 130 to pivot at fastener 143 extended through the opening at third interface 177.

Referring to FIG. 3, linkage 140 includes a body 141 forming a plurality of openings 142, 144, 146 each extending through body 141. Body 141 includes a first member 147 extending in a first direction and a second member 149 extending a second direction oblique or perpendicular to the first direction. Opening 142 is configured to correspond to third interface 177 (FIG. 1) at which fastener 143 is extended into linkage 140 and cutting blade 130.

Linkage 140 forms a first linkage opening 144 and a second linkage opening 146 each extending through body 141. First linkage opening 142 and second linkage opening 144 are each separated substantially along an axis corresponding to an extension of the first handle 110 when cutting blade 130 and cutting member 112 are together in a closed position, such as depicted via axis 125 in FIG. 4A and FIG. 5A. Fastener 123 (FIG. 1) is configured to be received through one of a pair of first fastener opening 122 and first linkage opening 144, such as depicted in FIGS. 4A-4B, or a pair of second fastener opening 124 and second linkage opening 146, such as depicted in FIGS. 5A-5B.

Figure 4B:
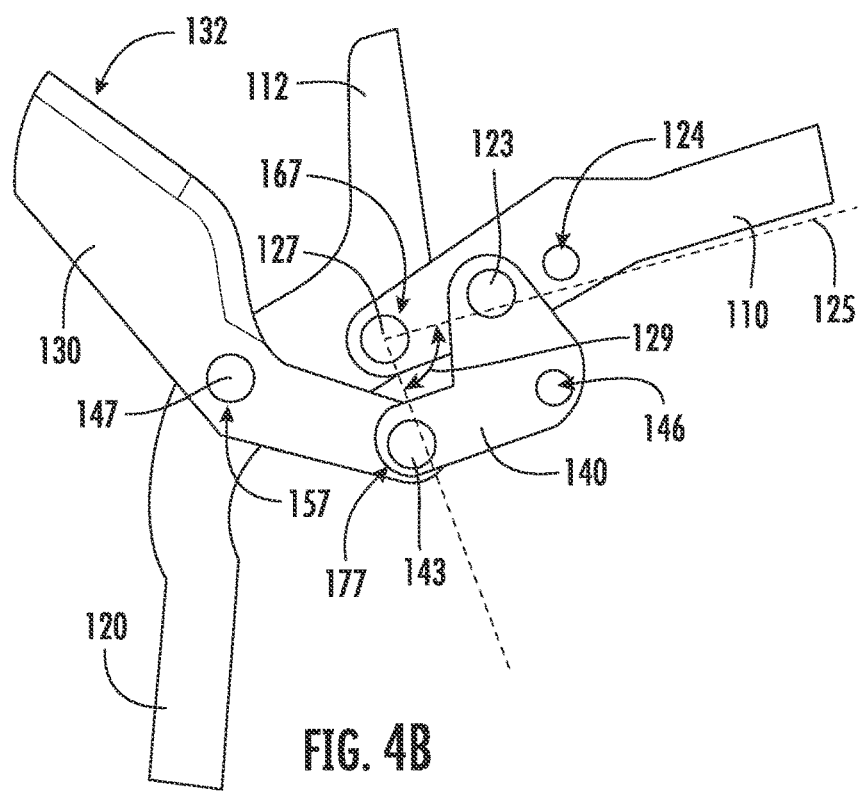
FIG. 4B depicts an exemplary embodiment of the hand tool of FIG. 1 in a first operating mode in an open position in accordance with aspects of the present disclosure.

In accordance with an exemplary embodiment, hand tool 100 includes a first mode of operation, such as depicted in FIGS. 4A-4B. In the exemplary first mode of operation, fastener 123 is extended through first fastener opening 122 (FIG. 2) at the first handle 110 and through first linkage opening 144 at linkage 140 (FIG. 3). Accordingly, first handle 110 is attachable via fastener 123 in the first operating mode to the cutting blade 130 at the first fastener opening 122 and the first handle 110 at the first fastener opening 122. FIG. 4A depicts hand tool 100 in an exemplary closed position and FIG. 4B depicts hand tool 100 in an exemplary open position. In the first mode of operation, hand tool 100 allows first handle 110 to extend into open position by pivoting relative to fastener 127 at second interface 167 (FIG. 1). Fastener 123 is extended into openings 122, 144 (FIGS. 2-3), allowing for compound action movement of second handle 120 relative to cutting blade 130 through linkage 140. Cutting blade 130 pivots via fastener 147 at first interface 157 (FIG. 1). First mode of operation allows first handle 110 to extend in open position, such as extended from closed position (FIG. 4A) to open position (FIG. 4B), at an angle 129. In various embodiments, first handle 110 may extend at angle 129 up to approximately 92 degrees from the closed position (FIG. 4A) to the open position (FIG. 4B). In such an embodiment, first mode of operation may form a compound mode or compound action movement of the hand tool 100 from the closed position to the open position.

Figure 5A:
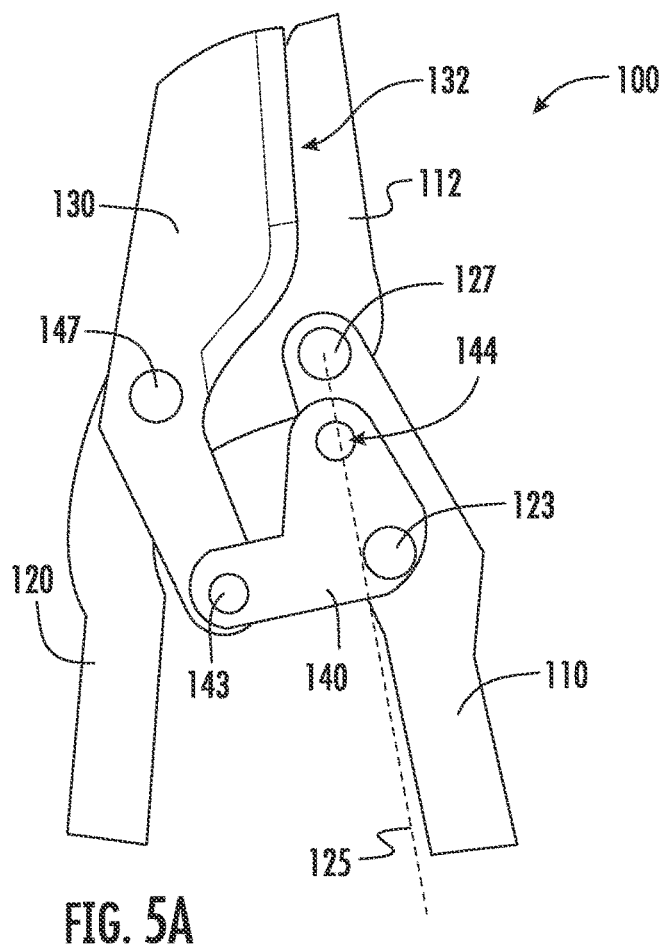
FIG. 5A depicts an exemplary embodiment of the hand tool of FIG. 1 in a second operating mode in a closed position in accordance with aspects of the present disclosure.
Figure 5B:
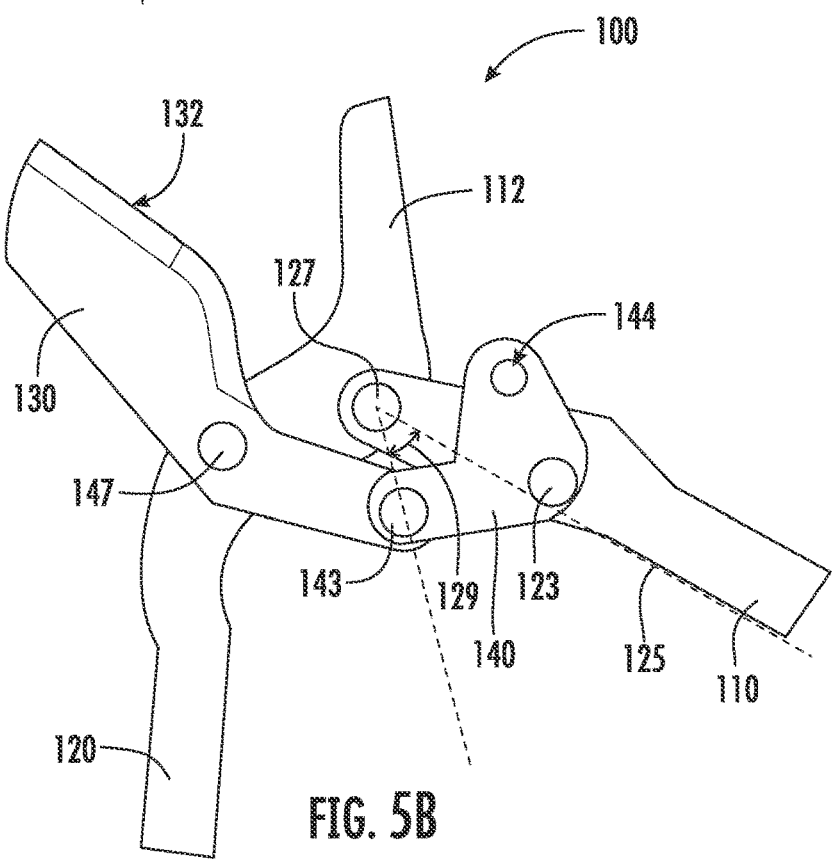
FIG. 5B depicts an exemplary embodiment of the hand tool of FIG. 1 in a second operating mode in an open position in accordance with aspects of the present disclosure.

In accordance with an exemplary embodiment, hand tool 100 includes a second mode of operation, such as depicted in FIGS. 5A-5B. In the exemplary second mode of operation, fastener 123 is extended through second fastener opening 124 (FIG. 2) at the first handle 110 and through second linkage opening 146 at linkage 140 (FIG. 3). Accordingly, first handle 110 is attachable via fastener 123 in the second operating mode to the cutting blade 130 at the second fastener opening 124 and the first handle 110 at the second fastener opening 124. FIG. 5A depicts hand tool 100 in an exemplary closed position and FIG. 5B depicts hand tool 100 in an exemplary open position. In the second mode of operation, hand tool 100 allows first handle 110 to extend into open position by pivoting relative to fastener 127 at second interface 167 (FIG. 1). Fastener 123 is extended into openings 124, 146 (FIGS. 2-3), allowing for movement of first handle 110 relative to cutting blade 130 through linkage 140. Cutting blade 130 pivots via fastener 147 at first interface 157 (FIG. 1). Second mode of operation allows first handle 110 to extend in open position, such as extended from closed position (FIG. 5A) to open position (FIG. 5B), at angle 129. In various embodiments, first handle 110 may extend at angle 129 up to approximately 49 degrees from the closed position (FIG. 5A) to the open position (FIG. 5B).

In various embodiments, first handle 110, second handle 120, cutting blade 130, and linkage 140 form separable components relative to one another. Fasteners 127, 143, 147 may each include pins, screws, bolts, or other mechanical fasteners appropriate for allowing pivoting movement such as described above. Fastener 123 may include any appropriate type of mechanical fastener. Fastener 123 may furthermore include any appropriate type of mechanical fastener such as may allow for quick-disconnect and re-assembly of fastener 123 into pairs of openings at linkage 140 and second handle 120, such as described above.

Figure 6:
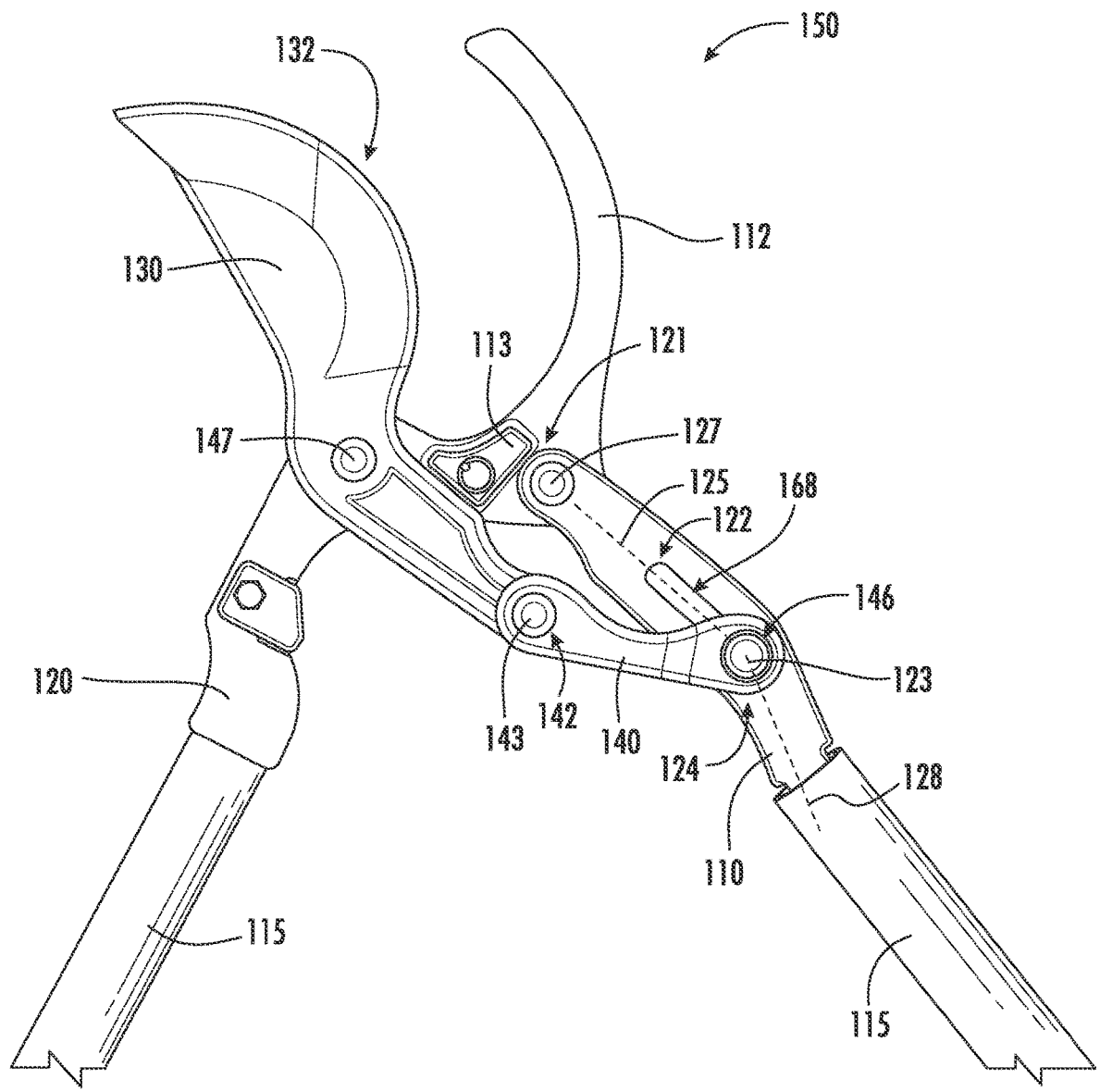
FIG. 6 depicts an exemplary embodiment of a hand tool in accordance with aspects of the present disclosure.
Figure 7:
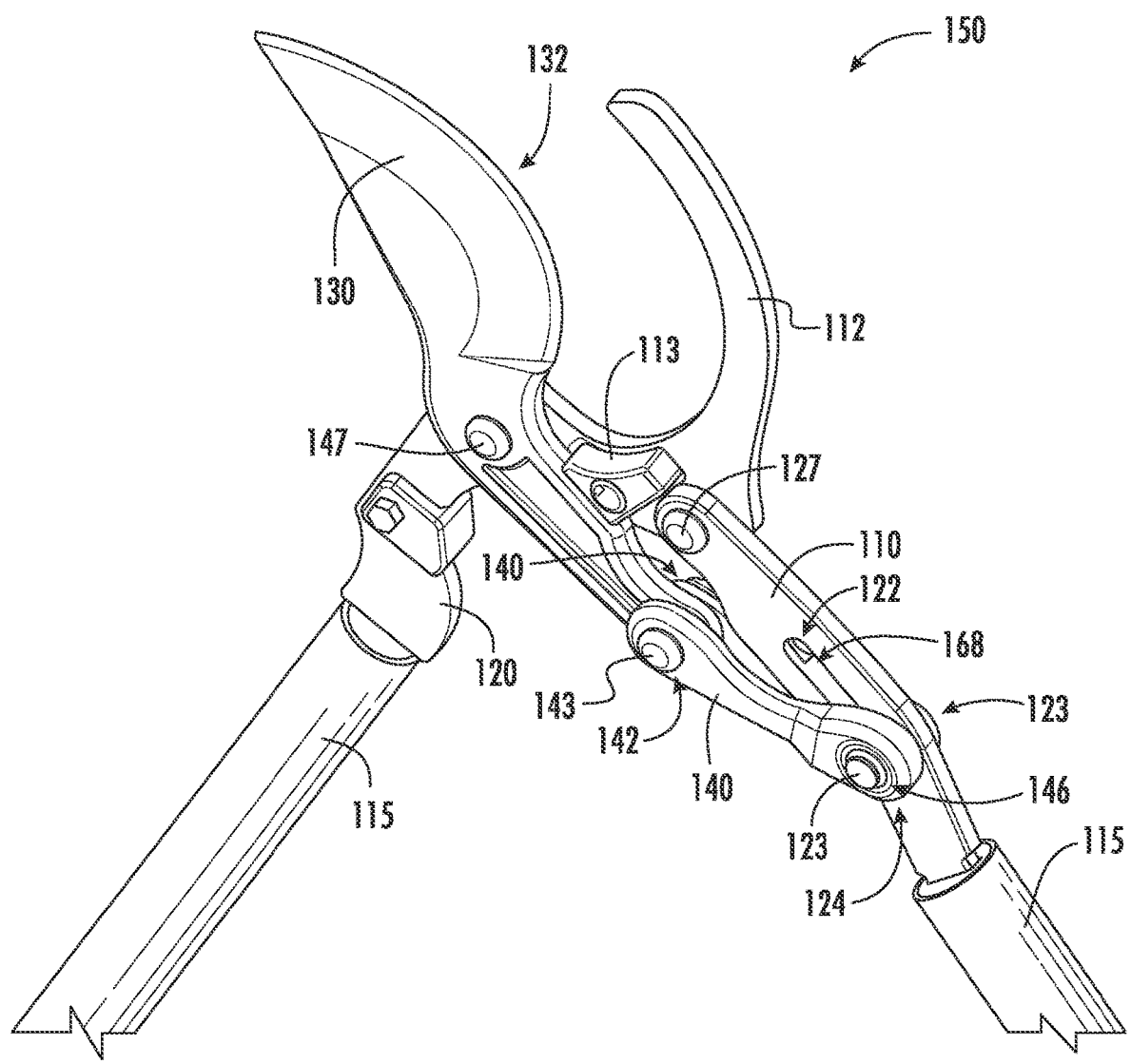
FIG. 7 depicts a perspective view of an exemplary embodiment of the hand tool of FIG. 6 in accordance with aspects of the present disclosure.

Referring now to FIGS. 6-7, exemplary embodiments of hand tool 150 are provided. Hand tool 150 includes a shear assembly having a first handle 110, a second handle 120, a cutting member 112, and a cutting blade 130, such as described in regard to hand tool 100. A reference axis 125 extends substantially along an extension of first handle 110. In a particular embodiment, reference axis 125 extends from a center point of opening 126 configured to receive fastener 127. First handle 110 forms a channel 168 extending substantially along axis 125. Channel 168 is configured to receive fastener 123. In a still particular embodiment, channel 168 is extended from a first end proximate to proximal end 121 to a second end distal to the proximal end 121 along axis 125. Channel 168 forms a first fastener opening or end 122 at the first end and a second fastener opening or end 124 at the second end.

Referring still to FIGS. 6-7, linkage 140 forms a pair of linkage openings 142, 146. Linkage opening 142 (e.g., a first linkage opening) is configured to receive fastener 143. Fastener 143 is configured to extend through opening 142 and extend through cutting blade 130, such as described in regard to interface 177. Accordingly, cutting blade 130 is pivotably connected linkage 140 at fastener 143 through opening 142. Linkage opening 146 (e.g., a second linkage opening) is configured to receive fastener 123. Fastener 123 is configured to extend through channel 168. Accordingly, cutting blade 130 is connected to first handle 110 via linkage 140 via fastener 123 extending through channel 168.

Fastener 123 is further configured allow for selective articulation or movement through channel 168. In a first operating mode, or compound mode, fastener 123 is positioned through channel 168 at first fastener opening or end 122. Such positioning may allow for greater angular movement of first handle 110 relative to second handle 120, such as depicted and described in regard to FIGS. 4A-4B. In a second operating mode, or single action mode, fastener 123 is positioned through channel 168 at second fastener opening or end 124. Such positioning may allow for relatively quick cutting action movement of first handle 110 and second handle 120.

Referring to FIG. 7, in a particular embodiment, hand tool 150 may include a pair of linkages 140. A first and second linkage 140 may be position at opposing sides of first handle 110 and cutting blade 130. Accordingly, fasteners 123, 143 may be configured to fasten or connect the pair of linkages 140 and the respective cutting blade 130 and first handle 110 between the pair of linkages 140. Fastener 123 may be configured as a pin, spring-loaded device, button, rod, or other appropriate type of mechanical fastener such as may allow for selectively sliding movement of fastener 123 to ends 122, 124 through channel 168.

Referring back to FIGS. 6-7, in certain embodiments, hand tool 150 further includes guide piece 113. Guide piece 113 is positioned at second handle 120 and configured to interface with one or both of cutting blade 130 and first handle 110. In a particular embodiment, proximal end 121 of first handle 110 is configured to abut guide piece 113. Guide piece 113 may be configured as an end stop, such as to limit movement of cutting blade 130 or linkage 140 into first handle 110 or one or more fasteners (e.g., fastener 127).

In still various embodiments, first handle 110 includes a first portion 110A and a second portion 110B. First portion 110A extends substantially along axis 125 (e.g., first axis). In a particular embodiment, reference axis 128 (e.g., second axis) extends at an acute angle relative to axis 125. In a still particular embodiment, reference axis 128 extends toward second handle 120. In various embodiments, openings (e.g., opening 126, 122, 124) and channel 168 are formed through first portion 110A of first handle 110. Second portion 110B may particularly form a portion of the first handle 110 at which handle grip 115 is positioned onto the first handle 110. In a particular embodiment, first portion 110A and second portion 110B allow handle grip 115 at first handle 110 to position more closely to the handle grip 115 at the second handle 120 when in a closed position. When the user articulates the handle grips 115 into an open position, the user may receive power transfer benefits related to compound action movement and speed benefits related to single action movement while further having a reduced arc between the handle grips 115.

Referring now to FIGS. 8-12, exemplary embodiment of hand tool 200 are provided. Hand tool 200 includes a shear assembly having a first handle 210 and a second handle 220. A cutting member 222, such as a shaving block or shearing tool, is attached to the second handle 220. Fastener 221 is configured to extend through cutting member 222 into second handle 220 to affix cutting member 222 at a first location relative to the second handle 220. Cutting member 222 is configured to selectively engage a cutting blade 230. Cutting member 222 includes a cutting tool 223. Cutting blade 230 includes blade edge 232 configured to selectively engage cutting member 222, such as to cut, shear, or lop a member placed between the blade edge 232 and the cutting tool 223.

Cutting blade 230 is connected to second handle 220 at a second handle-cutting blade interface, such as a first interface 257. In a particular embodiment, fastener 247 extends into cutting blade 230, cutting member 222, and second handle 220, such as through an opening extended correspondingly into cutting blade 230, cutting member 222, and second handle 220 at the first interface 257. Accordingly, fastener 247 may affix cutting blade 230, cutting member 222, and second handle 220 in a stacked arrangement. Fastener 247 allows for cutting blade 230 to pivot based on movement or articulation of first handle 210.

Cutting blade 230 is connected to first handle 210 at a first handle-cutting blade interface, such as a second interface 267. In a particular embodiment, fastener 227 extends into cutting blade 230 and first handle 210, such as through an opening extended correspondingly into cutting blade 230 and first handle 210. Accordingly, fastener 227 may affix cutting blade 230 and first handle 210 in a stacked arrangement. In still particular embodiments, first interface 247 is positioned proximate to a blade edge 232 at cutting blade 230 and cutting tool 223 at cutting member 222. Furthermore, first interface 247 is positioned more proximate to the blade edge 232 and cutting tool 223 than second interface 227.

Cutting blade 230 forms a first opening corresponding to the second interface 267 and a second opening corresponding to third interface 269. The first opening and the second opening are each separated substantially along an axis corresponding to an extension of the first handle 210 when cutting blade 230 and cutting member 222 are together in a closed position, such as depicted via axis 225 in FIG. 8 and FIG. 11.

Figure 13:
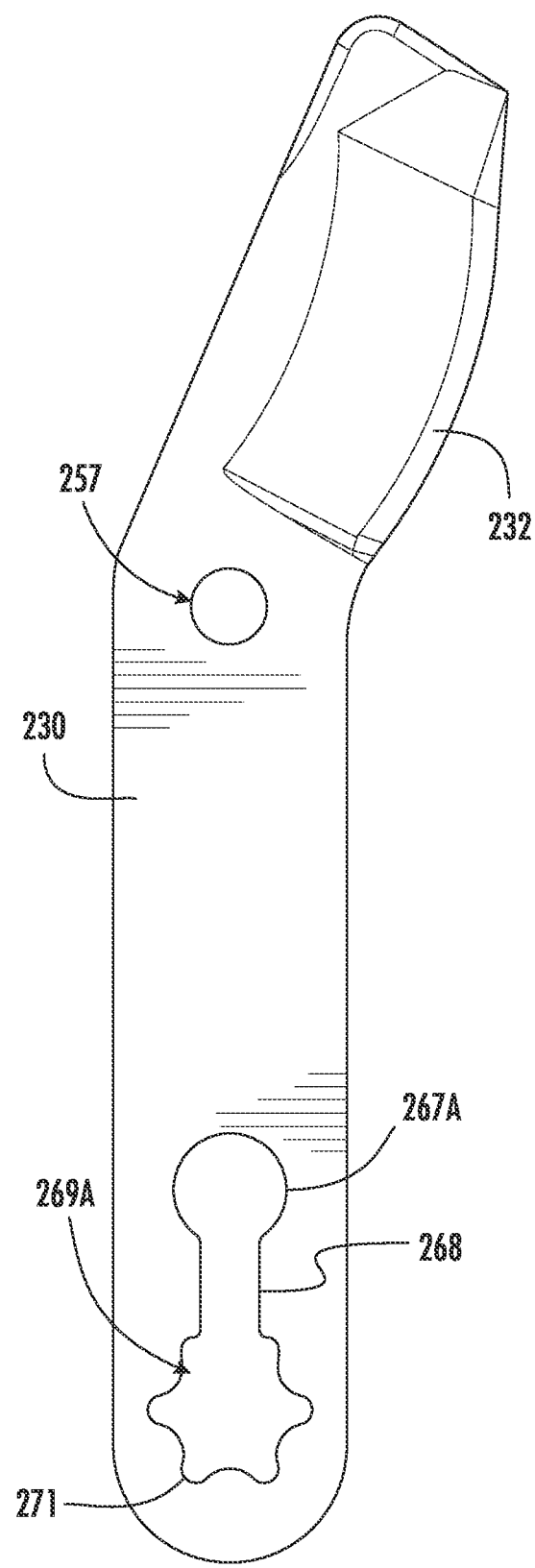
FIG. 13 depicts a top-down view of an exemplary embodiment of a cutting blade in accordance with aspects of the present disclosure.

First handle 210 includes a plurality of first teeth 214 configured to selectively engage with a plurality of second teeth 224 at second handle 220, such as further described herein. In a first operating mode, the plurality of first teeth 214 and the plurality of second teeth 224 are engaged to one another. In a second operating mode, the plurality of first teeth 214 and the plurality of second teeth 224 are disengaged from one another. Referring briefly to the perspective views provided in FIGS. 13-14, an embodiment of cutting blade 230 is provided. Cutting blade 230 forms an opening and channel along which fastener 227 is allowed to translate. In particular, cutting blade 230 forms a substantially circular orifice 267A and a substantially star-patterned opening 269A connected together by channel 268. The star-pattern opening 269A includes a plurality of lobes 271 extending from an inner circumference. In a particular embodiment, the star-pattern opening 269A corresponds to a star bit, a hexalobular internal, or other appropriate multi-point pattern, such as to limit stripping, provide high torque transfer, and resistance to wear. In a still particular embodiment, the substantially circular orifice 267A is formed at the cutting blade 230 and positioned more proximate to the blade edge 232 in contrast to the star-patterned opening 269A. Still further, first interface 257 is positioned more proximate to the blade edge 232 than orifice 267A. In various embodiments, such as further described herein, fastener 227 may form a pin, a locking pin, a rod, a tie rod, or other structure configured to fasten, secure, hold, or otherwise retain two or more components in position.

Figure 15:
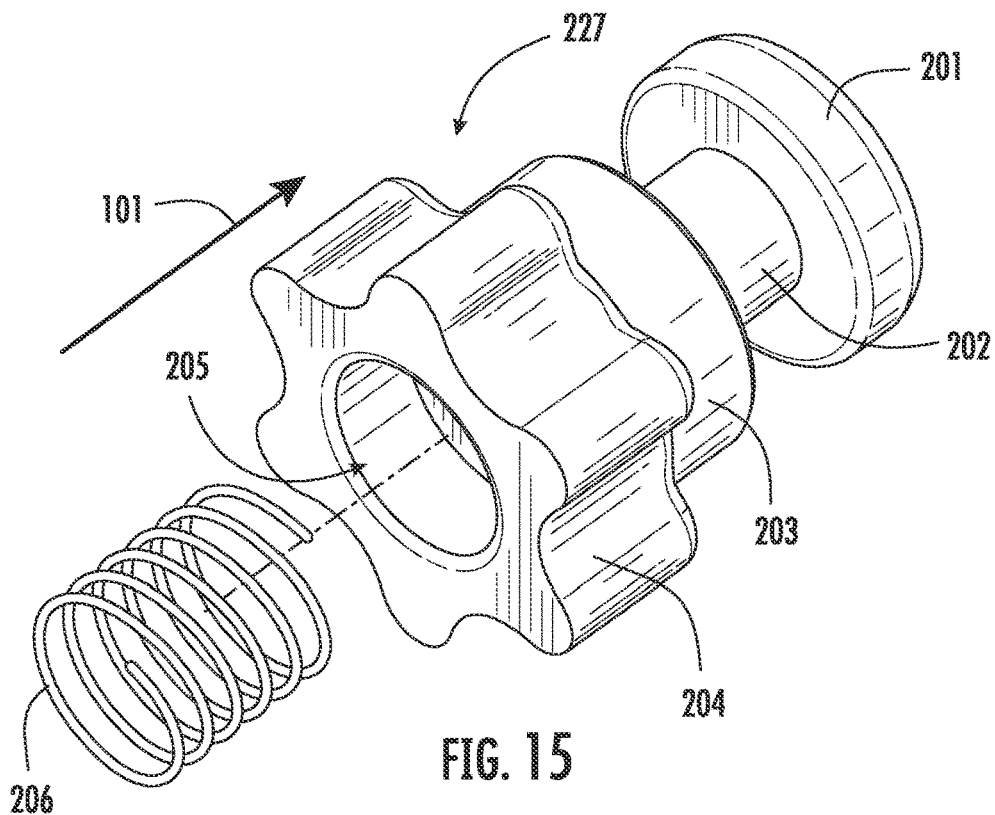
FIG. 15 depicts a perspective view of an exemplary embodiment of a fastener in accordance with aspects of the present disclosure.
Figure 16:
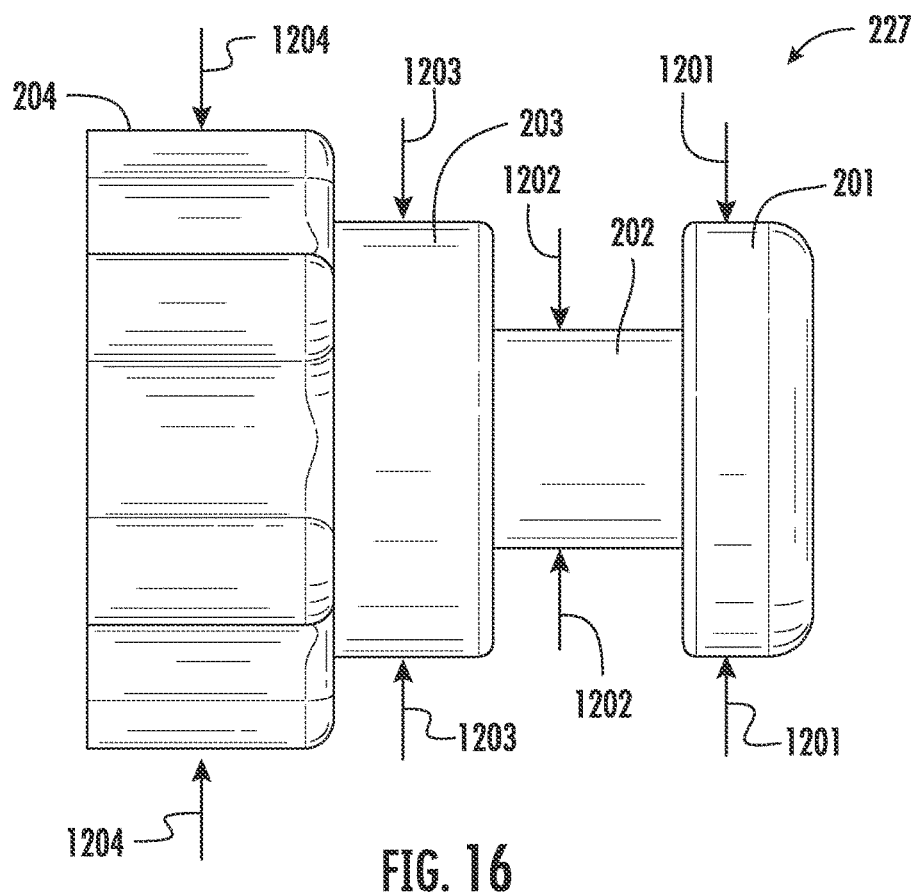
FIG. 16 depicts a side view of an exemplary embodiment of the fastener of FIG. 15 in accordance with aspects of the present disclosure.

Referring briefly to the perspective views provided in FIGS. 15-16, an embodiment of fastener 227 is provided. Fastener 227 forms a cap 201, a neck 202, cylindrical body 203, and a star body 204. In particular embodiments, cap 201, neck 202, cylindrical body 203, and star body 204 are each formed in serial arrangement relative to one another. In particular, cap 201 is positioned at a first end along the upward direction 101, and wherein the star body 204 is positioned at a second end distal to the first end. Neck 202 is positioned proximate to the cap 201. Cylindrical body 203 is positioned proximate to star body 204. Cylindrical body 203 and neck 202 abut one another.

Figure 14:
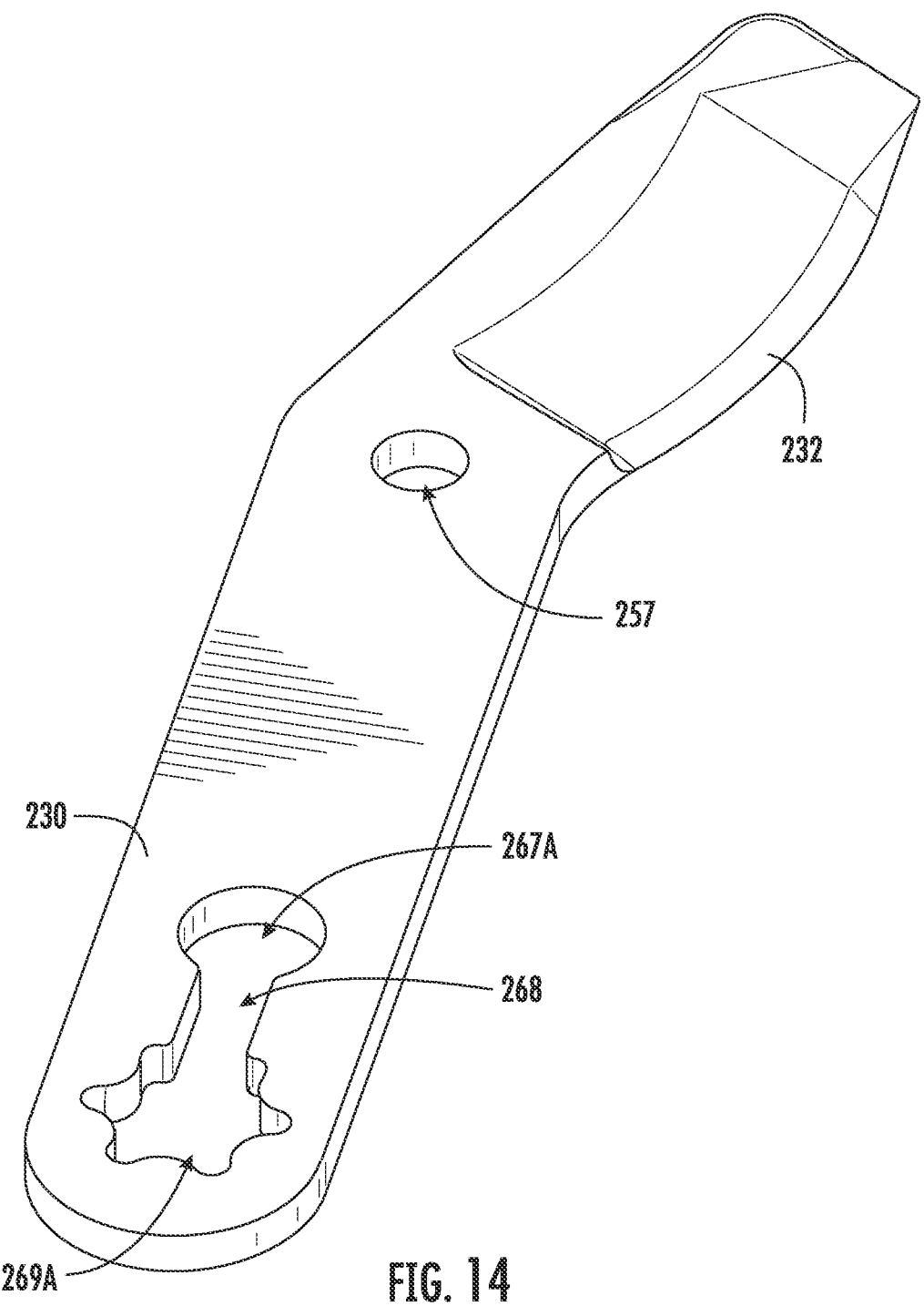
FIG. 14 depicts a perspective view of an exemplary embodiment of the cutting blade of FIG. 13 in accordance with aspects of the present disclosure.

Cap 201 forms a body at which a user is allowed to push fastener 227 down into cutting blade 230. Neck 202 forms a relatively narrow portion allowing fastener 227 to slide or articulate through channel 268 into either orifice 267A or opening 269A (FIG. 14). Cylindrical body 203 is configured to position in orifice 267A (FIG. 14). Star body 204 is configured to position in opening 269A. As further described herein, hand tool 220 is configured to operate in different modes based at least on sliding or articulating fastener 227. Particular portions of fastener 227 are configured to position into particular openings, such as to desirably position first handle 210 relative to second handle 220. Particular modes of operation particularly engage or disengage the plurality of first teeth 214 at first handle 210 relative to the plurality of second teeth 224 at second handle 220.

Referring to FIG. 15, fastener 227 forms a cavity 205 extending into star body 205. A spring 206 or springing device is configured to position into cavity 205. Spring 206 is configured to push or bias fastener 227 in an upward direction 101. Referring to FIG. 16, in various embodiments, fastener 227 includes a plurality of diameters 1201, 1202, 1203, 104 each corresponding respectively to cap 201, neck 202, cylindrical body 203, and star body 204. Diameter 1201 corresponds to cap 201. Diameter 1202 corresponds to neck 202. In a particular embodiment, spring 206 exerts a force along the upward direction 101 to position diameter 1203, corresponding to cylindrical body 203, into corresponding geometry at orifice 267A when fastener 227 is correspondingly aligned to orifice 267A. When a user pushes cap 201 along a downward direction (i.e., opposite of the upward direction 101), diameter 1201 limits an extent to which cap 201 may be pushed along the downward direction. When the user pushes cap 201 along the downward direction, diameter 1202 of neck 202 is positioned to allow for movement along channel 268 (FIG. 14). Diameter 1202 is configured to permit fastener 227 to slide or articulate through channel 268 into either orifice 267A or opening 269A (FIG. 14). Diameter 1203 corresponds to cylindrical body 203. Diameter 1204 corresponds to star body 204. In a particular embodiment, spring 206 exerts a force along the upward direction 101 to position diameter 1204, corresponding to star body 204, into corresponding geometry at opening 269A when fastener 227 is correspondingly aligned to orifice 269A. In certain embodiments, diameter 1204 is an outer diameter greater than diameter 1203. In still certain embodiments, diameters 1201, 1203 are greater than diameter 1202.

Figure 17:
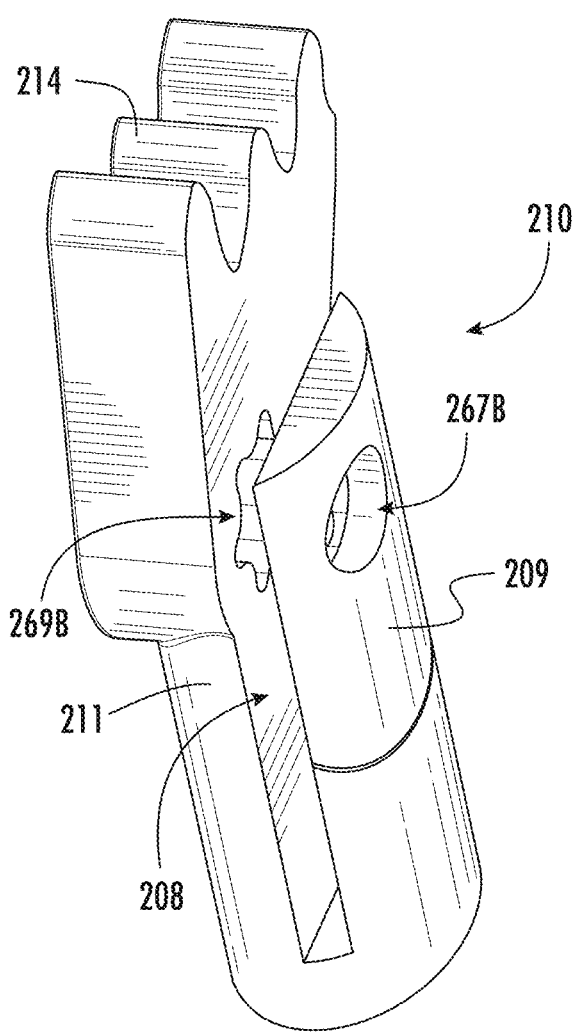
FIG. 17 depicts a perspective view of an exemplary embodiment of a first handle in accordance with aspects of the present disclosure.
Figure 18:
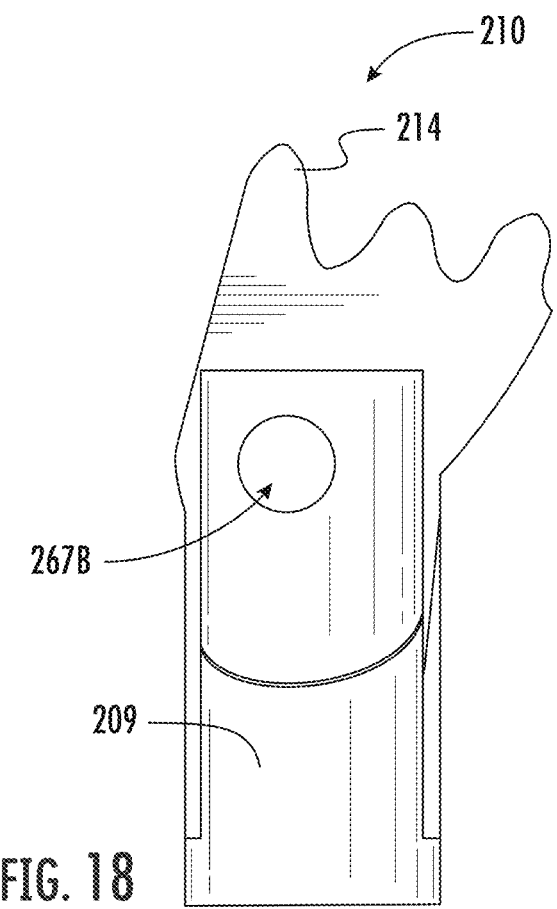
FIG. 18 depicts a top-down view of an exemplary embodiment of the first handle of FIG. 17 in accordance with aspects of the present disclosure.

Referring briefly to the perspective view provided in FIG. 17 and view provided in FIG. 18, an embodiment of at least a portion of first handle 210 is provided. First handle 210 includes a buttress 209 extending over a main body 211 of the first handle 210. A slot 208 is formed between buttress 209 and main body 211. In an embodiment, the plurality of first teeth 214 is extended from the main body 211. Orifice 267B is formed through buttress 209 and extending therethrough, such as to correspond to cap 201 of fastener 227. Opening 269B is formed extended into main body 211, such as to correspond to star body 204. Spring 206 and star body 204 of fastener 227 (FIG. 15) is positioned in opening 269B at first handle 210.

An exemplary first operating mode of hand tool 200 includes a user pushing fastener 227 along the downward direction and pushing first handle 210 forward (i.e., toward an interface of first teeth 214 and second teeth 224). When the user pushes first handle 210 to align cylindrical body 203 of fastener 227 with opening 267A at cutting blade 230, spring 206 pushes or snaps cylindrical body 203 into position at orifice 267A at cutting blade 230. First teeth 214 are moved toward to engage with second teeth 224, such as configured as gear teeth meshed into one another. Engagement of teeth 214, 224 allows for compound action movement of the cutting blade 230 when articulating first handle 210 and second handle 220 toward one another to perform a cutting action between blade edge 232 and cutting member 222. Accordingly, the plurality of first teeth 214 is engaged with the plurality of second teeth 224 in the first operating mode via fastener 227 extending through orifice 267A at cutting blade 230.

Another exemplary mode of operation of hand tool 200 includes a user pushing fastener 227 along the downward direction (i.e., opposite of upward direction 101). Star body 204 portion of fastener 227 is depressed into opening 269B at first handle 210. Neck 202 is positioned to allow for sliding or articulation along channel 268 of cutting blade 230 (FIG. 14). In an exemplary second operating mode, user pulls first handle 210 back (i.e., away from an interface of first teeth 214 and second teeth 224). When user pulls first handle 210 back to align star body 204 of fastener 227 with opening 269A at cutting blade 230, spring 206 pushes or snaps star body 204 of fastener 227 into position at opening 269A at cutting blade 230, such as to lock the first handle 210 to the cutting blade 230. Locking the first handle 210 to the cutting blade 230 forms a first position at which teeth 214, 224 are disengaged from one another. Accordingly, the plurality of first teeth 214 is disengaged from the plurality of second teeth 224 in the second operating mode via fastener 227 articulating through the channel 268 and extending through the opening 269A at cutting blade 230.

Figure 8:
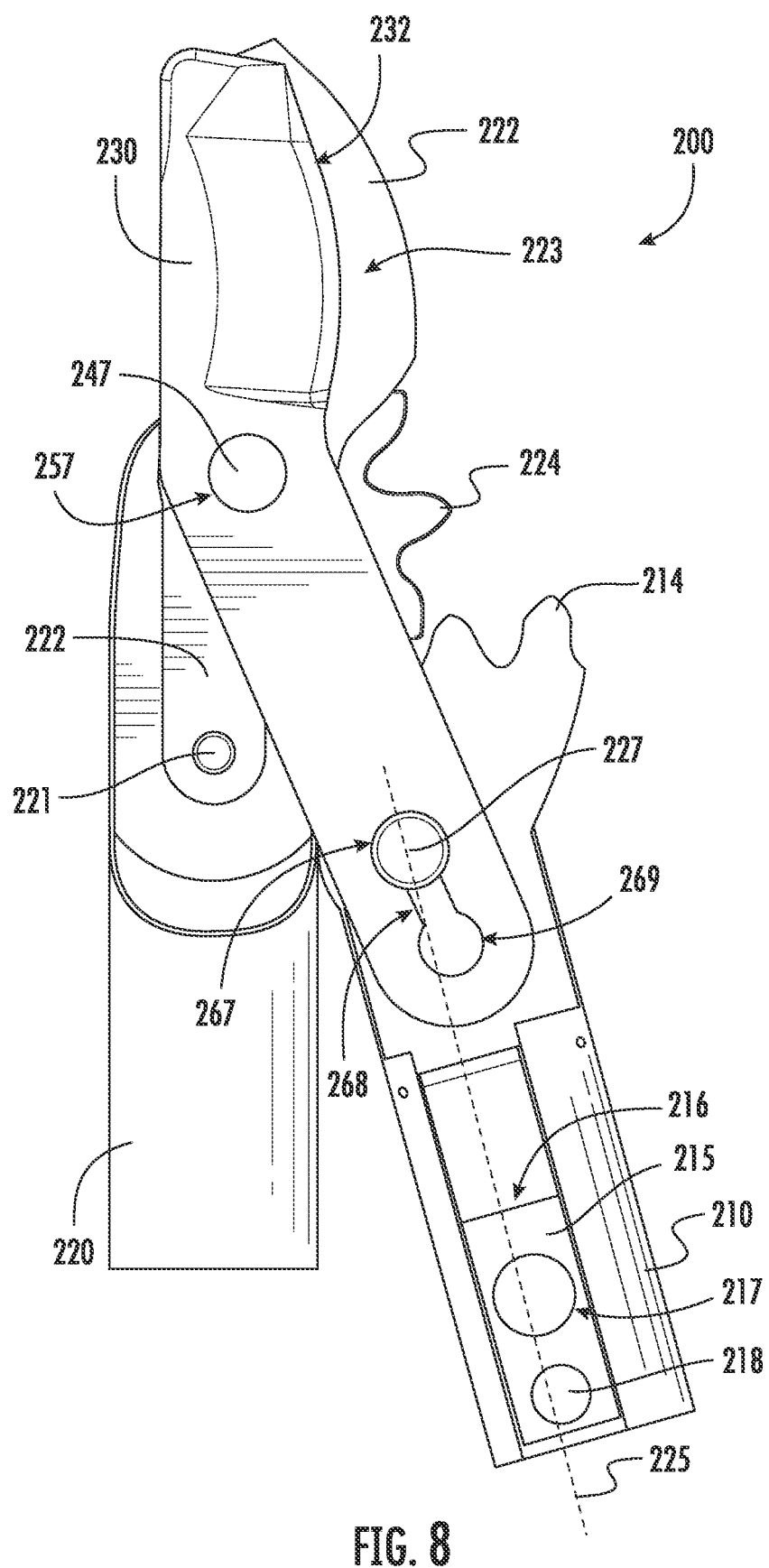
FIG. 8 depicts a top-down view of an exemplary embodiment of a hand tool in accordance with aspects of the present disclosure.
Figure 9:
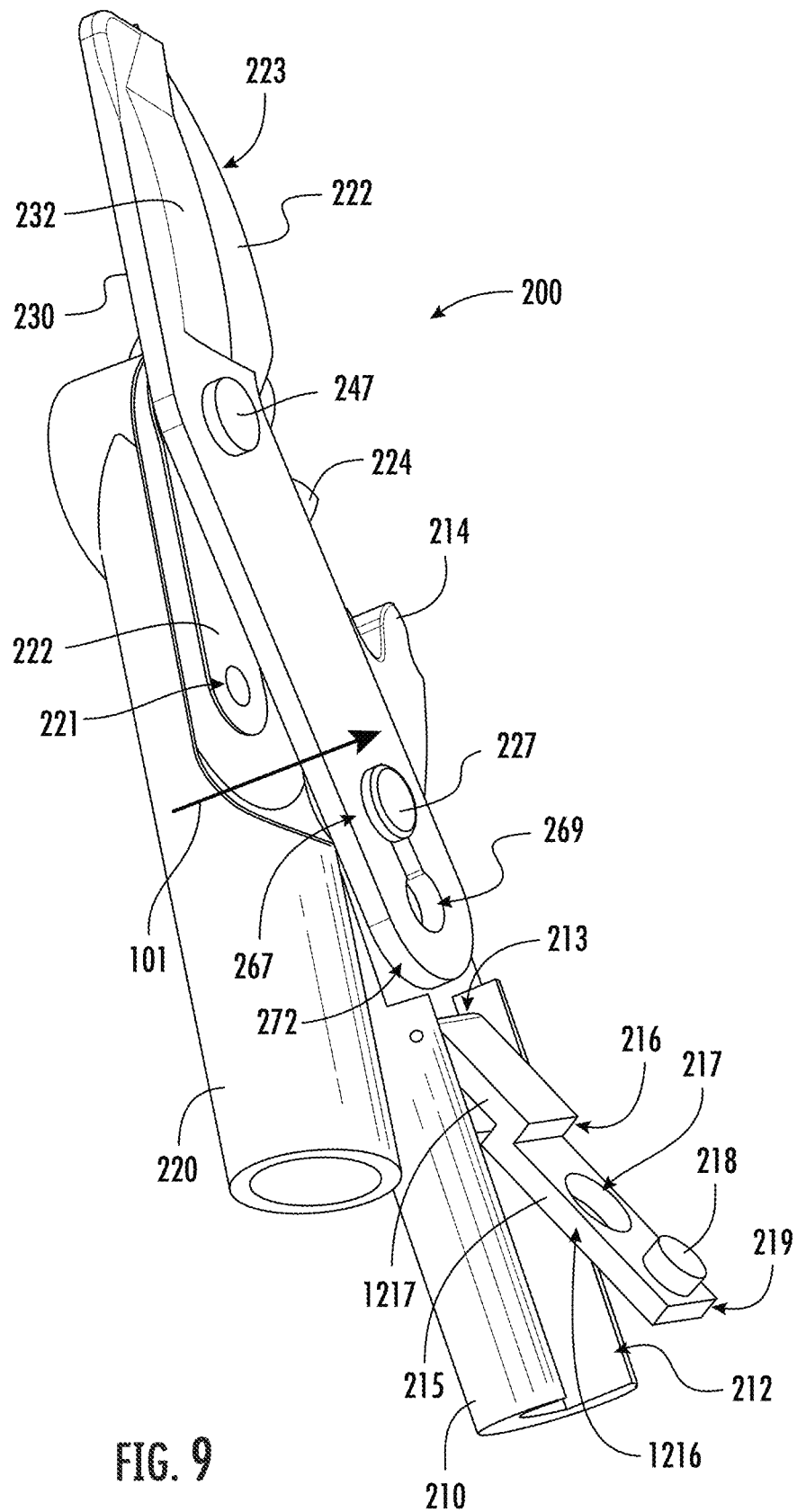
FIG. 9 depicts a perspective view of an exemplary embodiment of the hand tool of FIG. 8 in accordance with aspects of the present disclosure.
Figure 10:
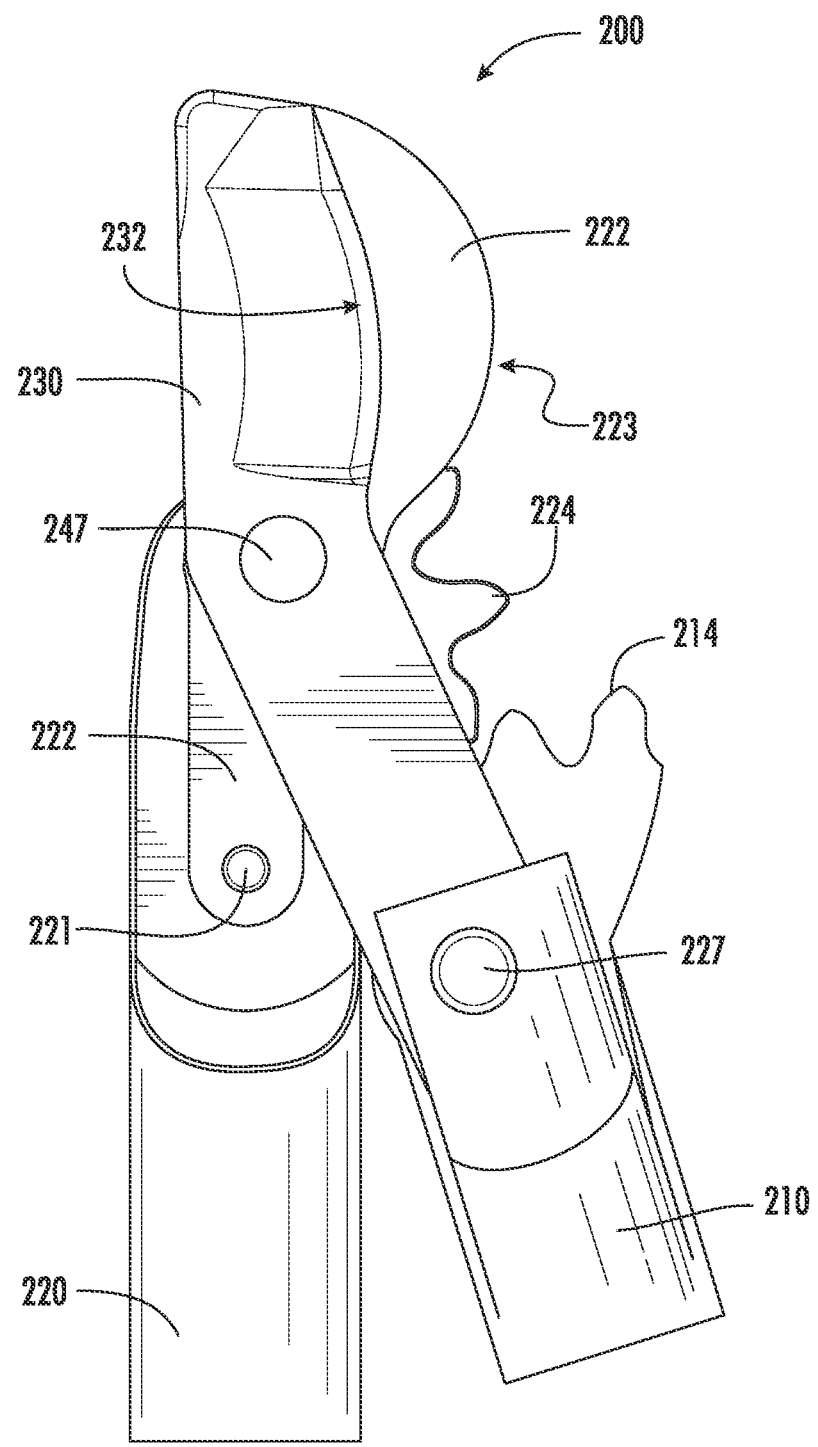
FIG. 10 depicts a top-down view of an exemplary embodiment of a hand tool in accordance with aspects of the present disclosure.
Figure 11:
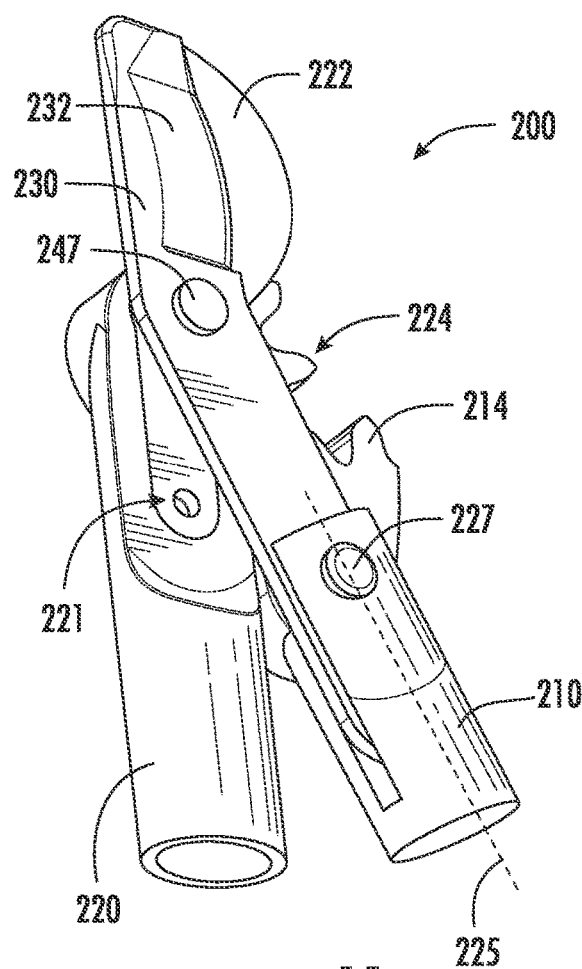
FIG. 11 depicts a perspective view of an exemplary embodiment of the hand tool of FIG. 10 in accordance with aspects of the present disclosure.
Figure 12:
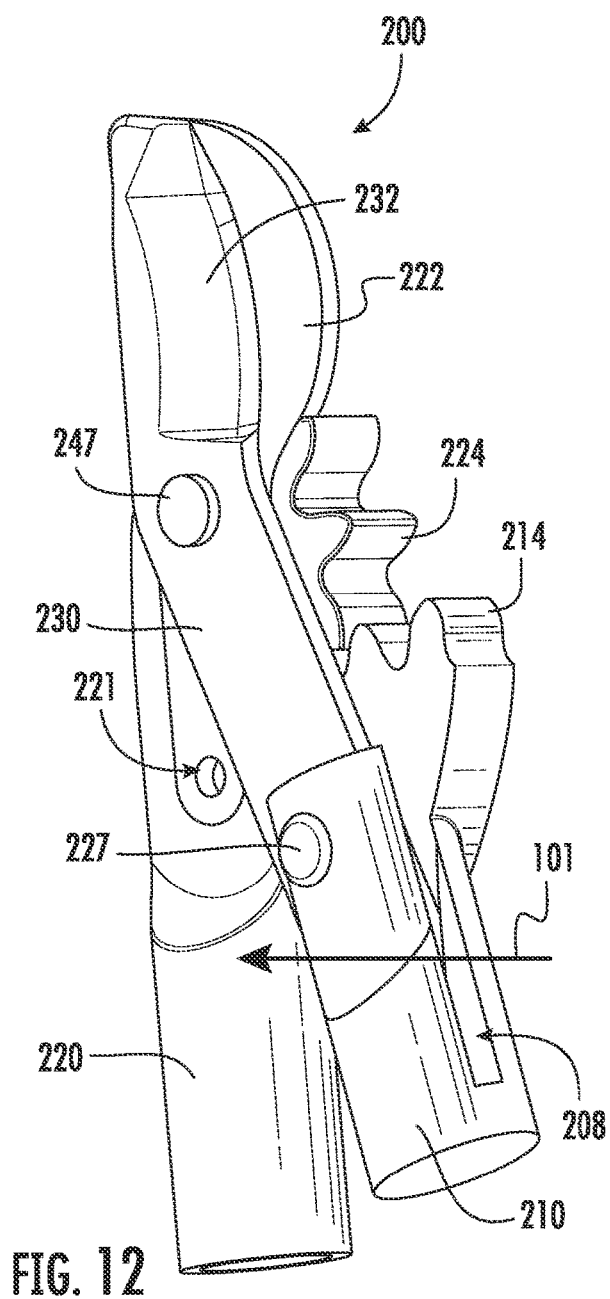
FIG. 12 depicts a perspective view of an exemplary embodiment of the hand tool of FIG. 10 in accordance with aspects of the present disclosure.

Referring back to the exemplary embodiments depicted in FIGS. 8-9, in certain embodiments, hand tool 200 includes a lock mechanism 215 at first handle 210. In a particular embodiment, lock mechanism 215 is secured within a channel 212 formed within first handle 210. A hinge 213 attaches lock mechanism 215 to interior walls of first handle 210 at channel 212. Lock mechanism 215 forms an opening 217 configured to correspond to fastener 227, such as to allow at least a portion of fastener 227 to extend into opening 217 when lock mechanism 215 is rotated or flipped into position over fastener 227. Lock mechanism 215 includes a body configured to extend within channel 212 at first handle 210. Lock mechanism 215 includes a step 216 configured to position a first portion 1216 of lock mechanism 215 in a different plane from a second portion 1217. In particular, step 216 may allow the first portion 1216 at which opening 217 is positioned to extend over fastener 227 while second portion 1217 is positioned alongside an aft end 272 of cutting blade 230. Lock mechanism 215 may further include a pin 218. In a particular embodiment, pin 218 is positioned at an aft end 219 of lock mechanism 215. In a still particular embodiment, pin 218 is positioned at aft end 219 of first portion 1216 of lock mechanism 215.

Referring still to FIGS. 8-9, cutting blade 230 may form an opening at second interface 267. Cutting blade 230 forms an opening at a third interface 269. Respective openings 267, 269 are connected via channel 268.

An exemplary mode of operation of hand tool 200, such as depicted in FIGS. 8-9, includes modes of operation such as described above. An exemplary mode of operation of hand tool 200 includes a user pushing fastener 227 along the downward direction (i.e., opposite of upward direction 101). The user slides or otherwise articulates the first handle 210 back (i.e., away from an interface of first teeth 214 and second teeth 224), such as to disengage first teeth 214 from second teeth 224. The user slides the first handle 210 back until fastener 227 is positioned through opening 269. The user flips or rotates lock mechanism 215, such as via hinge 213, to align opening 217 over fastener 227. Additionally, user rotates lock mechanism to position pin 218 into opening 267. When lock mechanism 215 is rotated, such as to position pin 218 into opening 267, step 216 is positioned adjacent to aft end 272 of cutting blade 230. Accordingly, rotation or other movement of first handle 210 relative to cutting blade 230 is limited. Another exemplary mode of operation of hand tool 200 includes depressing fastener 227 and sliding fastener 227 through channel 268 from opening 269 to opening 267, such as to allow for first teeth 214 to engage second teeth 224. Such mode of operation positions hand tool 200 in a compound mode such as described herein.

Figure 19:
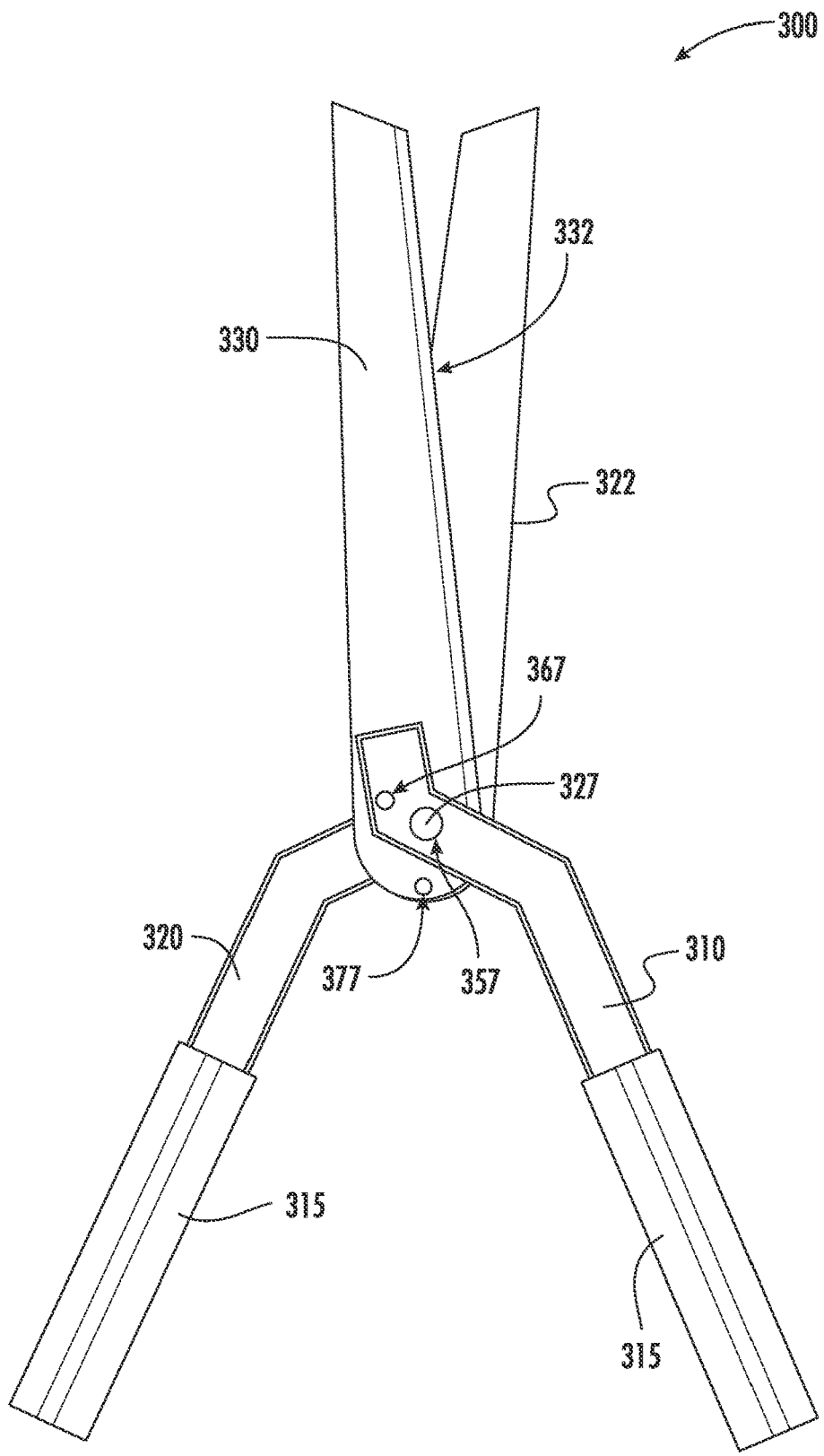
FIG. 19 depicts a top-down view of an exemplary embodiment of a hand tool in a first operating mode in accordance with aspects of the present disclosure.
Figure 20:
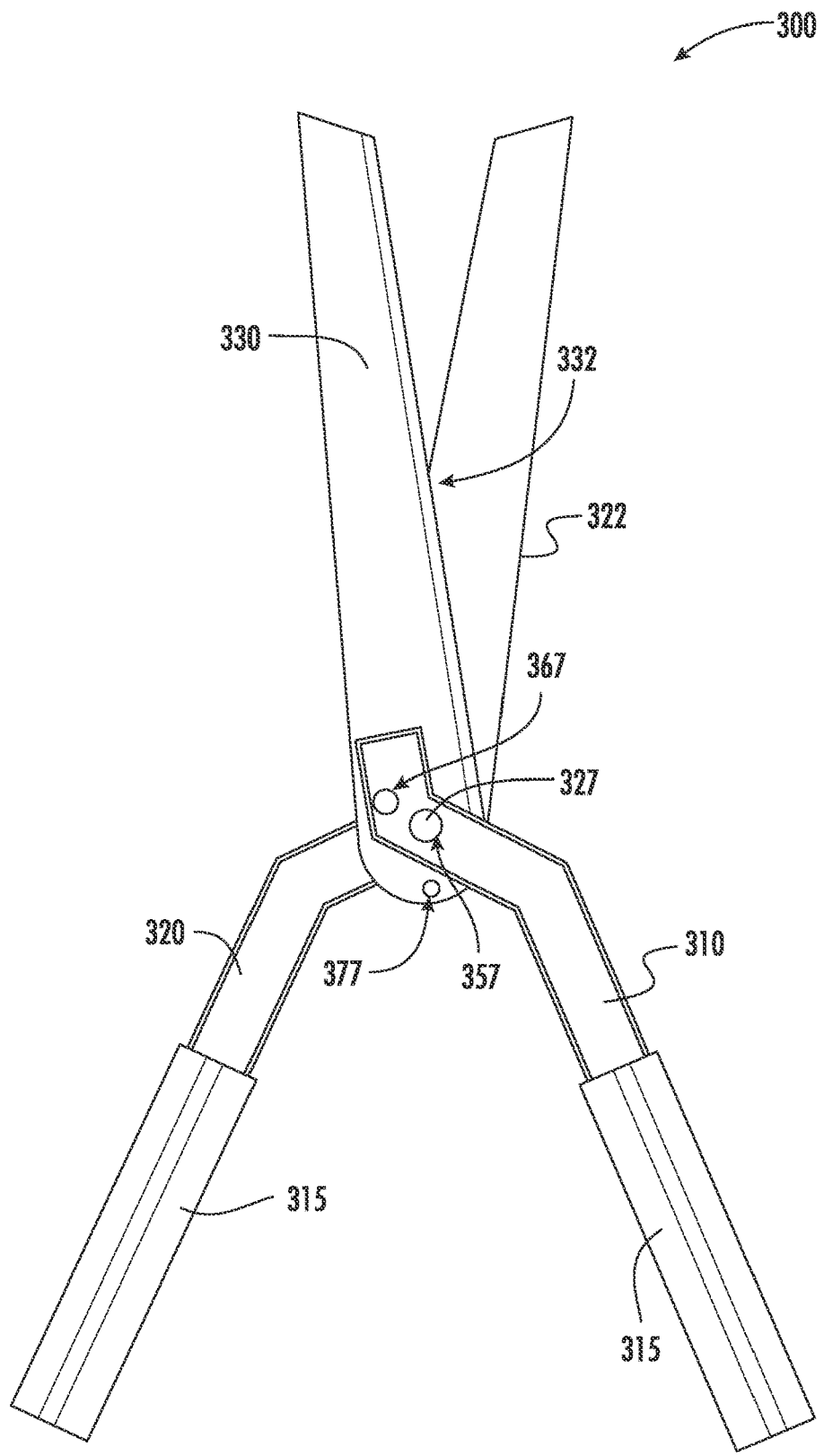
FIG. 20 depicts a top-down view of an exemplary embodiment of the hand tool of FIG. 19 in a second operating mode in accordance with aspects of the present disclosure.

Referring now to FIGS. 19-20, exemplary embodiments of hand tool 300 are provided. Embodiments of hand tool 300 include embodiments of shear assemblies such as depicted and described in detailed view of hand tool 100, 200 provided above. Hand tool 300 includes a first handle 310 having a cutting blade 330 connected to the first handle 310. Hand tool 300 includes fastener 327 at interface 357. First handle 310 is configured to slide or otherwise articulate at interface 357. In certain embodiments, fastener 327 is configured substantially such as described above in regard to fastener 127 or fastener 227. In a first operating mode, such as depicted in FIG. 19, interfaces 367, 377 each provide pivot points when fastener 327 is positioned in a compound action position at a channel at interface 357. In various embodiments, interface 357 may be configured substantially as described above in regard to channel 268 and openings 267, 269. In a second operating mode, such as depicted in FIG. 20, fastener 343 is positioned at interface 367, such as to lock first handle 310 in position relative to cutting blade 330. Interface 357 provides a pivot point at fastener 327. Second operating mode may accordingly provide a single action configuration of hand tool 300.

Embodiments of hand tool 300 allow for a compound action movement with first handle 310 fixed with two (2) pivot positions and allowed to slide across a channel at interface 357 along the cutting blade 330. When a user changes hand tool 300 into single action operating mode, a lower pivot restraint is removed from interface 377 and a fastener 343 is positioned at interface 367, such as to lock or restrain the cutting blade 330 relative to first handle 310 to articulate as one. Such operating mode may lock fastener 327 at the channel at interface 357 from a sliding movement to a pivot point. A user may change hand tool 300 from compound action movement to single pivot movement by articulating three (3) fasteners or pins in and out. A fastener at interface 377 is removed and a pair of locked fasteners or pins at respective sides of the hand tool are pushed in to lock the first handle 310 along with the cutting blade 330 and prevent pivoting moment around the first handle 310 and the cutting blade 330.

Embodiments of hand tool 100, 150, 200, 300 may be interchanged with one another, or include aspects of one another. Hand tool 150 depicted in FIGS. 6-7 may include handle grips 115 selectively connectable to various embodiments of first handle 110, 210, 310 and second handle 120, 220, 320 such as provided herein. Hand tool 300 depicted in FIGS. 19-20 may include handle grips 315 selectively connectable to various embodiments of first handle 110, 210, 310 and second handle 120, 220, 320 such as provided herein.

Certain embodiments of hand tool (e.g., hand tool 150, 200, 300) may allow a user to switch between the first and second operating modes (i.e., the compound and single action movements) without necessitating removal of a fastener (e.g., fastener 123, 227) from the first handle (e.g., first handle 110, 210). Compound action movement allows the user to open the hand tool to a wider position, such as to apply greater force through the handles and through to the cutting member and cutting blade. Single action movement allows the user to open the hand tool to a lesser angle relative to the compound action movement, such as to allow the user to articulate the handles, and associated cutting blade and cutting member, with greater speed. Embodiments of the hand tool provided herein may allow the user to articulate between the compound mode and single action mode relatively quickly. Still further embodiments of the hand tool provided herein may allow such articulation between modes without necessitating additional parts, components, fasteners, and without requiring removal of fasteners, parts, or components from the hand tool.

Further aspects of the invention are provided by one or more of the following clauses:

1. A hand tool, the hand tool including a first handle; a second handle comprising a cutting member; and a cutting blade forming a first opening and a second opening, wherein the first handle is attachable in a first operating mode to the cutting blade at the first opening via a first fastener, wherein the first handle is attachable in a second operating mode to the cutting blade at the second opening via the first fastener, and wherein the cutting blade is attached in pivotal arrangement to the second handle via a second fastener.

2. The hand tool of any one or more clauses herein, wherein the cutting blade includes a linkage at which the first opening and the second opening are formed.

3. The hand tool of any one or more clauses herein, wherein the cutting blade and linkage are pivotally attached via a third fastener.

4. The hand tool of any one or more clauses herein, wherein the first handle forms a first fastener opening and a second fastener opening, wherein the first fastener opening is separated along the axis from the second fastener opening.

5. The hand tool of any one or more clauses herein, wherein the first handle is attachable via the first fastener in the first operating mode to the cutting blade at the first opening and the first handle at the first fastener opening.

6. The hand tool of any one or more clauses herein, wherein the first handle is attachable via the first fastener in the second operating mode to the cutting blade at the second opening and the first handle at the second fastener opening.

7. The hand tool of any one or more clauses herein, wherein the first handle includes a plurality of first teeth, and wherein the second handle includes a plurality of second teeth.

8. The hand tool of any one or more clauses herein, wherein the plurality of first teeth and the plurality of second teeth are engaged to one another in the first operating mode, and wherein the plurality of first teeth and the plurality of second teeth are disengaged from one another in the second operating mode.

9. The hand tool of any one or more clauses herein, wherein the cutting blade forms a channel connecting the first opening and the second opening.

10. The hand tool of any one or more clauses herein, wherein the plurality of first teeth is engaged with the plurality of second teeth in the first operating mode via the first fastener extending through the first opening at the cutting blade.

11. The hand tool of any one or more clauses herein, wherein the plurality of first teeth is disengaged from the plurality of second teeth in the second operating mode via the first fastener articulating through the channel and extending through the second opening at the cutting blade.

12. The hand tool of any one or more clauses herein, wherein a lock mechanism is rotatably attached to the first handle, wherein the lock mechanism forms an opening corresponding to the first fastener.

13. The hand tool of any one or more clauses herein, wherein the lock mechanism includes a pin positioned at an aft end of the lock mechanism, wherein the pin corresponds to the first opening at the cutting blade.

14. The hand tool of any one or more clauses herein, wherein the lock mechanism includes a step, wherein the step positions a first portion of the lock mechanism in a different plane from a second portion of the lock mechanism, and wherein the pin is positioned at the aft end of the first portion.

15. The hand tool of any one or more clauses herein, wherein the pin is positioned in the first opening at the cutting blade when the first fastener is positioned in the second opening, and wherein the lock mechanism surrounds the first fastener through the opening when in the second operating mode.

16. The hand tool of any one or more clauses herein, wherein the second opening at the cutting blade forms a star-pattern opening.

17. The hand tool of any one or more clauses herein, wherein the first handle includes a buttress extending over a main body, wherein a slot extending along the axis is formed between the buttress and the main body.

18. The hand tool of any one or more clauses herein, wherein the first handle forms a fastener opening into the main body, and wherein the fastener opening forms a star-pattern corresponding to the star-pattern opening at the cutting blade.

19. The hand tool of any one or more clauses herein, wherein the first handle forms a fastener opening into the main body, wherein the fastener opening forms a star-pattern corresponding to the star-pattern opening at the cutting blade, and wherein the buttress forms an orifice extending through the buttress in alignment with the fastener opening at the main body.

20. The hand tool of any one or more clauses herein, wherein the first fastener includes a cap; a neck; a cylindrical body; and a star body, wherein the cap, the neck, the cylindrical body, and the star body are in serial arrangement relative to one another.

21. The hand tool of any one or more clauses herein, wherein the first fastener opening and the second fastener opening are connected via a channel formed through the first handle.

22. The hand tool of any one or more clauses herein, wherein the first handle forms a channel extending along an axis of extension of the first handle.

23. The hand tool of any one or more clauses herein, wherein the channel forms a first fastener opening at a proximal end of the first handle, and wherein the channel forms a second fastener opening distal to the proximal end.

24. The hand tool of any one or more clauses herein, wherein the hand tool is any one or more of a hedge shear, a garden shear, a lopper, a pruner tool.

25. A hand tool, the hand tool including a first handle; a second handle including a cutting member; a cutting blade forming a first opening and a second opening, wherein the first opening and the second opening are each separated substantially along an axis corresponding to an extension of the first handle when the cutting blade and the cutting member are together in a closed position, wherein the first handle is attachable in a first operating mode to the cutting blade at the first opening via a first fastener, wherein the first handle is attachable in a second operating mode to the cutting blade at the second opening via the first fastener, and wherein the cutting blade is attached in pivotal arrangement to the second handle via a second fastener.

26. A shear assembly, the shear assembly including the first handle of any one or more clauses herein; the second handle including the cutting member; and the cutting blade of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hand tool, the hand tool comprising:
    a first handle comprising a plurality of first teeth and a first handle fastener opening;
    a second handle comprising a cutting member, a plurality of second teeth, and a second handle fastener opening; and
    a cutting blade comprising a cutting blade opening, wherein a second handle fastener extends into the second handle fastener opening and the cutting blade opening to connect the cutting blade to the second handle in pivotable arrangement, the cutting blade comprising a first opening, a second opening, and a channel extending from the first opening to the second opening, wherein the first opening and the second opening are wider than the channel, wherein a cutting blade fastener extends into the first handle fastener opening of the first handle at the first handle fastener opening, and wherein the cutting blade fastener is translatable in the channel relative to the cutting blade to extend into the first opening to engage the plurality of first teeth to the plurality of second teeth in a first operating mode, and wherein the cutting blade fastener is translatable in the channel relative to the cutting blade to extend into the second opening to disengage the plurality of first teeth from the plurality of second teeth in a second operating mode.

2. The hand tool of claim 1, wherein a lock mechanism is rotatably attached to the first handle at the channel formed in the first handle, and wherein the lock mechanism forms an opening corresponding to the cutting blade fastener when the cutting blade fastener is translated into the second opening.

3. The hand tool of claim 2, wherein the lock mechanism comprises a pin receivable into the first opening when the cutting blade fastener is translated into the second opening.

4. The hand tool of claim 3, wherein the lock mechanism comprises a step, wherein the step positions a first portion of the lock mechanism in a different plane from a second portion of the lock mechanism, and wherein the pin is positioned on the first portion.

5. The hand tool of claim 4, wherein the pin is positioned in the first opening of the cutting blade when the cutting blade fastener is positioned in the second opening, and wherein a lock mechanism opening formed in the lock mechanism surrounds the cutting blade fastener through the second opening when in the second operating mode.

6. The hand tool of claim 1, wherein the second opening of the cutting blade forms a multi-point pattern.

7. The hand tool of claim 1, wherein the first handle comprises a buttress and a main body, wherein the buttress extends along the main body, and wherein a slot is formed between the buttress and the main body, wherein the plurality of first teeth extend from the main body, and wherein the first handle fastener opening extends through the buttress, and wherein the cutting blade is disposed in the slot.

8. The hand tool of claim 7, wherein the first handle forms a main body fastener opening extending into the main body, and wherein the main body fastener opening forms a multi-point pattern corresponding to a multi-point pattern of the second opening of the cutting blade, and wherein the cutting blade fastener comprises a multi-point body corresponding to the multi-point pattern of the main body fastener opening and the multi-point pattern of the second opening of the cutting blade.

9. The hand tool of claim 7, wherein the first handle forms a main body fastener opening extending into the main body, wherein the main body fastener opening forms a multi-point pattern corresponding to a multi-point pattern at the second opening at the cutting blade, the first handle fastener opening forming an orifice extending through the buttress in alignment with the main body fastener opening at the main body.

10. The hand tool of claim 1, wherein the cutting blade fastener comprises:
    a cap;
    a neck;
    a cylindrical body; and
    a multi-point body,
    wherein the cap, the neck, the cylindrical body, and the multi-point body are in serial arrangement relative to one another at the fastener.

11. The hand tool of claim 10, wherein the cutting blade fastener comprises a cavity extending into the multi-point body, and wherein a spring is positioned in the cavity and the first handle to exert an outward direction force at the cutting blade fastener.

12. The hand tool of claim 11, wherein the spring exerts the outward direction force to position the multi-point body in the second opening having a multi-point pattern corresponding to the multi-point body.

13. The hand tool of claim 11, wherein the spring exerts the outward direction force to position the cylindrical body in the first opening of the cutting blade.

14. The hand tool of claim 11, wherein the cap comprises a cap diameter, and wherein the neck comprises a neck diameter, and wherein the cylindrical body comprises a body diameter, and wherein the spring exerts the outward direction force to position the body diameter into the first opening of the cutting blade when the cutting blade fastener is translated along the channel to the first opening.

15. The hand tool of claim 10, wherein the neck is configured to permit the fastener to articulate through the channel to the first opening and the second opening.

16. The hand tool of claim 10, wherein the first handle comprises a buttress and a main body, wherein the buttress extends along the main body, and wherein a slot is formed between the buttress and the main body, wherein the plurality of first teeth extend from the main body, and wherein the first handle fastener opening extends through the buttress, and wherein the first handle forms a main body fastener opening extending into the main body, and wherein the main body fastener opening forms a multi-point pattern corresponding to a multi-point pattern of the second opening of the cutting blade, and wherein the multi-point body comprises an outer dimension greater than a diameter corresponding to the cylindrical body, the cap, and the neck.

17. The hand tool of claim 16, wherein the diameter corresponding to the cylindrical body and the cap is greater than a diameter corresponding to the neck, and wherein the diameter corresponding to the neck permits the cutting blade fastener to articulate through the channel to the first opening and the second opening, and wherein the outer dimension corresponding to the multi-point body permits the multi-point body to align to the second opening and inhibit alignment to the first opening, and wherein the diameter corresponding to the cylindrical body permits the cylindrical body to align to the first opening and inhibit retention at the second opening.

\* \* \* \* \*